(12) United States Patent
Jang et al.

(10) Patent No.: US 12,408,083 B2
(45) Date of Patent: *Sep. 2, 2025

(54) TRANSMISSION OF CAPABILITY INFORMATION ABOUT LINK

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Namyeong Kim, Seoul (KR); Suhwook Kim, Seoul (KR); Sungjin Park, Seoul (KR); Taewon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,315

(22) Filed: Mar. 13, 2024

(65) Prior Publication Data

US 2024/0224124 A1 Jul. 4, 2024

Related U.S. Application Data

(63) Continuation of application No. 17/798,820, filed as application No. PCT/KR2020/018878 on Dec. 22, 2020, now Pat. No. 12,200,544.

(30) Foreign Application Priority Data

Feb. 12, 2020 (KR) .................. 10-2020-0017243
Feb. 12, 2020 (KR) .................. 10-2020-0017244

(51) Int. Cl.
*H04W 28/20* (2009.01)
*H04W 84/12* (2009.01)

(52) U.S. Cl.
CPC ............ *H04W 28/20* (2013.01); *H04W 84/12* (2013.01)

(58) Field of Classification Search
CPC ................. H04W 28/20; H04W 84/12
See application file for complete search history.

(56) References Cited

U.S. PATENT DOCUMENTS

| 2011/0188598 | A1* | 8/2011 | Lee | H04B 7/0452 375/267 |
| 2012/0140842 | A1* | 6/2012 | Vermani | H04B 7/0617 375/295 |
| 2015/0029979 | A1 | 1/2015 | Onodera et al. | |
| 2016/0255610 | A1* | 9/2016 | Li | H04L 5/0053 370/329 |
| 2019/0335454 | A1 | 10/2019 | Huang et al. | |
| 2023/0164634 | A1* | 5/2023 | Jang | H04W 28/20 370/329 |

FOREIGN PATENT DOCUMENTS

| CN | 102474382 A | 5/2012 | |
| CN | 108684059 A | 10/2018 | |
| CN | 110741618 A | 1/2020 | |
| EP | 3654703 A1 * | 5/2020 | ............ H04W 28/10 |

* cited by examiner

*Primary Examiner* — Mohammad S Anwar
(74) *Attorney, Agent, or Firm* — BRYAN CAVE LEIGHTON PAISNER LLP

(57) ABSTRACT

The present disclosure relates to a method performed by a non-access point (AP) station (STA) multi-link device (MLD) of a wireless LAN system, the method comprising the steps of: transmitting, through a first link, a negotiation frame including first maximum number of spatial stream (NSS) information to an AP MLD; and receiving a negotiation response frame from the AP MLD through the first link.

15 Claims, 23 Drawing Sheets

(a)

(b)

PPDU Format (IEEE 802.11a/g)

HT PPDU Format (IEEE 802.11n)

VHT PPDU Format (IEEE 802.11ac)

FIG. 37

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

FIG. 38

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

FIG. 39

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000–0011 | 1–4 | 1 | | | | | | | 2–5 | 10 |
| | 0100–0110 | 2–4 | 2 | | | | | | | 4–6 | |
| | 0111–1000 | 3–4 | 3 | | | | | | | 6–7 | |
| | 1001 | 4 | 4 | | | | | | | 8 | |
| 3 | 0000–0011 | 1–4 | 1 | 1 | | | | | | 3–6 | 13 |
| | 0100–0110 | 2–4 | 2 | 1 | | | | | | 5–7 | |
| | 0111–1000 | 3–4 | 3 | 1 | | | | | | 7–8 | |
| | 1001–1011 | 2–4 | 2 | 2 | | | | | | 6–8 | |
| | 1100 | 3 | 3 | 2 | | | | | | 8 | |
| 4 | 0000–0011 | 1–4 | 1 | 1 | 1 | | | | | 4–7 | 11 |
| | 0100–0110 | 2–4 | 2 | 1 | 1 | | | | | 6–8 | |
| | 0111 | 3 | 3 | 1 | 1 | | | | | 8 | |
| | 1000–1001 | 2–3 | 2 | 2 | 1 | | | | | 7–8 | |
| | 1010 | 2 | 2 | 2 | 2 | | | | | 8 | |

FIG. 40

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000–0011 | 1–4 | 1 | 1 | 1 | 1 | | | | 5–8 | 7 |
| | 0100–0101 | 2–3 | 2 | 1 | 1 | 1 | | | | 7–8 | |
| | 0110 | 2 | 2 | 2 | 1 | 1 | | | | 8 | |
| 6 | 0000–0010 | 1–3 | 1 | 1 | 1 | 1 | 1 | | | 6–8 | 4 |
| | 0011 | 2 | 2 | 1 | 1 | 1 | 1 | | | 8 | |
| 7 | 0000–0001 | 1–2 | 1 | 1 | 1 | 1 | 1 | 1 | | 7–8 | 2 |
| 8 | 0000 | 1 | 1 | 1 | 1 | 1 | 1 | 1 | 1 | 8 | 1 |

FIG. 41

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | 52 | 1 |
| 2 | 26 | 26 | 26 | 26 | 26 | 52 | 52 | 26 | 26 | 1 |
| 3 | 26 | 26 | 26 | 26 | 26 | 52 | 52 | 52 | 52 | 1 |
| 4 | 26 | 26 | 52 | 52 | 26 | 26 | 26 | 26 | 26 | 1 |
| 5 | 26 | 26 | 52 | 52 | 26 | 26 | 26 | 52 | 52 | 1 |
| 6 | 26 | 26 | 52 | 52 | 26 | 52 | 52 | 26 | 26 | 1 |
| 7 | 26 | 26 | 52 | 52 | 26 | 52 | 52 | 52 | 52 | 1 |
| 8 | 52 | 52 | 26 | 26 | 26 | 26 | 26 | 26 | 26 | 1 |
| 9 | 52 | 52 | 26 | 26 | 26 | 26 | 26 | 52 | 52 | 1 |
| 10 | 52 | 52 | 26 | 26 | 26 | 52 | 52 | 26 | 26 | 1 |
| 11 | 52 | 52 | 26 | 26 | 26 | 52 | 52 | 52 | 52 | 1 |
| 12 | 52 | 52 | 52 | 52 | 26 | 26 | 26 | 26 | 26 | 1 |
| 13 | 52 | 52 | 52 | 52 | 26 | 26 | 26 | 52 | 52 | 1 |
| 14 | 52 | 52 | 52 | 52 | 26 | 52 | 52 | 26 | 26 | 1 |
| 15 | 52 | 52 | 52 | 52 | 26 | 52 | 52 | 52 | 52 | 1 |
| 16 | 26 | 26 | 26 | 26 | 26 | 106 | 106 | 106 | 106 | 1 |
| 17 | 26 | 26 | 52 | 52 | 26 | 106 | 106 | 106 | 106 | 1 |
| 18 | 52 | 52 | 26 | 26 | 26 | 106 | 106 | 106 | 106 | 1 |
| 19 | 52 | 52 | 52 | 52 | 26 | 106 | 106 | 106 | 106 | 1 |

FIG. 42

| Indices | #1 | #2 | #3 | #4 | #5 | #6 | #7 | #8 | #9 | Number of entries |
|---|---|---|---|---|---|---|---|---|---|---|
| 20 | 106 | | | | 26 | 26 | 26 | 26 | 26 | 1 |
| 21 | 106 | | | | 26 | 26 | 26 | 52 | | 1 |
| 22 | 106 | | | | 26 | 52 | | 26 | 26 | 1 |
| 23 | 106 | | | | 26 | 52 | | 52 | | 1 |
| 24 | 52 | | 52 | | -- | 52 | | 52 | | 1 |
| 25 | 242-tone RU empty (with zero users) | | | | | | | | | 1 |
| 26 | 106 | | | | 26 | 106 | | | | 1 |
| 27-34 | 242 | | | | | | | | | 8 |
| 35-42 | 484 | | | | | | | | | 8 |
| 43-50 | 996 | | | | | | | | | 8 |
| 51-58 | 2*996 | | | | | | | | | 8 |
| 59 | 26 | 26 | 26 | 26 | 26 | 52+26 | | 26 | | 1 |
| 60 | 26 | 26+52 | | 26 | 26 | 26 | 26 | 26 | | 1 |
| 61 | 26 | 26+52 | | 26 | 26 | 26 | 52 | | | 1 |
| 62 | 26 | 26+52 | | 26 | 52 | | 26 | 26 | | 1 |
| 63 | 26 | 26 | 52 | | 26 | 52+26 | | 26 | | 1 |
| 64 | 26 | 26+52 | | 26 | 52+26 | | 26 | | | 1 |
| 65 | 26 | 26+52 | | 26 | 52 | | 52 | | | 1 |

FIG. 43

| | | | | | | | | |
|---|---|---|---|---|---|---|---|---|
| 66 | 52 | 26 | 26 | 26 | 52+26 | 26 | | 1 |
| 67 | 52 | | 52 | 26 | 52+26 | 26 | | 1 |
| 68 | 52 | | 52+26 | | 52 | | 52 | 1 |
| 69 | 26 | 26 | 26 | 26 | 26+106 | | | 1 |
| 70 | 26 | 26+52 | | 26 | 106 | | | 1 |
| 71 | 26 | 26 | 52 | | 26+106 | | | 1 |
| 72 | 26 | 26+52 | | | 26+106 | | | 1 |
| 73 | 52 | | 26 | 26 | 26+106 | | | 1 |
| 74 | 52 | | 52 | | 26+106 | | | 1 |
| 75 | 106+26 | | | 26 | 26 | 26 | 26 | 1 |
| 76 | 106+26 | | | 26 | 26 | 52 | | 1 |
| 77 | 106+26 | | | 52 | | 26 | 26 | 1 |
| 78 | 106 | | 26 | 52+26 | | 26 | | 1 |
| 79 | 106+26 | | | 52+26 | | 26 | | 1 |
| 80 | 106+26 | | | 52 | | 52 | | 1 |
| 81 | 106+26 | | | 106 | | | | 1 |
| 82 | 106 | | | 26+106 | | | | 1 |

FIG. 44

| Subfield | Definition | Encoding |
|---|---|---|
| Channel Width | This field, together with the HT Operation element STA Channel Width field, defines the BSS bandwidth (see 11.40.1). | Set to 0 for 20 MHz or 40 MHz BSS bandwidth. Set to 1 for 80 MHz, 160 MHz or 80+80 MHz BSS bandwidth. Set to 2 for 160 MHz BSS bandwidth (deprecated). Set to 3 for non-contiguous 80+80 MHz BSS bandwidth (deprecated). Values in the range 4 to 255 are reserved. |
| Channel Center Frequency Segment 0 | Defines a channel center frequency for an 80, 160, or 80+80 MHz VHT BSS. See 21.3.14. | For 80 MHz BSS bandwidth, indicates the channel center frequency index for the 80 MHz channel on which the VHT BSS operates. For 160 MHz BSS bandwidth and the Channel Width subfield equal to 1, indicates the channel center frequency index of the 80 MHz channel segment that contains the primary channel. For 160 MHz BSS bandwidth and the Channel Width subfield equal to 2, indicates the channel center frequency index of the 160 MHz channel on which the VHT BSS operates. For 80+80 MHz BSS bandwidth and the Channel Width subfield equal to 1 or 3, indicates the channel center frequency index for the primary 80 MHz channel of the VHT BSS. Reserved otherwise. |
| Channel Center Frequency Segment 1 | Defines a channel center frequency for a 160 or 80+80 MHz VHT BSS. See 21.3.14. | For a 20, 40, or 80 MHz BSS bandwidth, this subfield is set to 0. For a 160 MHz BSS bandwidth and the Channel Width subfield equal to 1, indicates the channel center frequency index of the 160 MHz channel on which the VHT BSS operates. For a 160 MHz BSS bandwidth and the Channel Width subfield equal to 2, this field is set to 0. For an 80+80 MHz BSS bandwidth and the Channel Width subfield equal to 1 or 3, indicates the channel center frequency index of the secondary 80 MHz channel of the VHT BSS. See Table 9-253. Reserved otherwise. |

FIG. 45

| Channel Center Frequency Segment 1 subfield value | BSS bandwidth |
|---|---|
| CCFS1 = 0 | 80 MHz or less |
| CCFS1 > 0 and \| CCFS1 − CCFS0 \| = 8 (40 MHz apart) | 160 MHz (CCFS0: center frequency of the 80 MHz channel segment that contains the primary channel) (CCFS1: center frequency of the 160 MHz channel) |
| CCFS1 > 0 and \| CCFS1 − CCFS0 \| > 16 (> 80 MHz apart) | 80+80 MHz (CCFS0: center frequency of the primary 80 MHz channel) (CCFS1: center frequency of the secondary 80 MHz channel) |
| CCFS1 > 0 and \| CCFS1 − CCFS0 \| < 8 (< 40 MHz apart) | Reserved |
| CCFS1 > 0 and 8 < \| CCFS1 − CCFS0 \| ≤ 16 (> 40 MHz and ≤ 80 MHz apart) | Reserved |
| NOTE 1—CCFS0 represents the value of the Channel Center Frequency Segment 0 subfield. NOTE 2—CCFS1 represents the value of the Channel Center Frequency Segment 1 subfield. | | ent
TRANSMISSION OF CAPABILITY INFORMATION ABOUT LINK

CROSS-REFERENCE TO RELATED APPLICATIONS

This application is a Continuation of U.S. patent application Ser. No. 17/798,820, filed on Aug. 10, 2022, which is the National Stage filing under 35 U.S.C. 371 of International Application No. PCT/KR2020/018878, filed on Dec. 22, 2020, which claims the benefit of Korean Patent Application No. 10-2020-0017243 filed on Feb. 12, 2020, and Korean Patent Application No. 10-2020-0017244 filed on Feb. 12, 2020, which are all hereby incorporated by reference herein in their entirety.

BACKGROUND

Field of the Disclosure

The present specification relates to a method of transmitting information on the maximum number of streams of a link in a wireless local area network (WLAN) system.

Related Art

Wireless network technologies may include various types of wireless local area networks (WLANs). The WLAN employs widely used networking protocols and can be used to interconnect nearby devices together. The various technical features described herein may be applied to any communication standard, such as WiFi or, more generally, any one of the IEEE 802.11 family of wireless protocols. A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

A method performed by a transmitting device in a wireless local area network (WLAN) system according to various embodiments may include a technical feature related to a method of transmitting information on the maximum number of streams. In a method performed in a non-access point (AP) station (STA) multi-link device (MLD) of the WLAN system, the non-AP STA MLD may transmit a negotiation frame including first maximum number of spatial stream (NSS) information to an AP MLD through a first link. The non-AP STA MLD may receive a negotiation response frame in response to the negotiation frame from the AP MLD through the first link.

According to an example of the present specification, maximum NSS capability information is transmitted/received to obtain an advantage of preventing a problem in that an MLD is not able to receive all streams because a stream with at least NSS capability is transmitted on a specific link.

BRIEF DESCRIPTION OF THE DRAWINGS

FIG. 37 illustrates an embodiment related to RU allocation information.

FIG. 38 illustrates an embodiment related to RU allocation information.

FIG. 39 illustrates an embodiment related to the number of spatial streams allocated to the plurality of user STAs which are allocated based on the MU-MIMO scheme FIG. 40 illustrates an embodiment related to the number of spatial streams allocated to the plurality of user STAs which are allocated based on the MU-MIMO scheme FIG. 41 illustrates an embodiment related to N-bit information for various RU allocations.

FIG. 42 illustrates an embodiment related to N-bit information for various RU allocations.

FIG. 43 illustrates an embodiment related to N-bit information for various RU allocations.

FIG. 44 illustrates an embodiment related to a VHT operation information subfield.

FIG. 45 illustrates an embodiment related to a channel center frequency segment (CCFS) 1 subfield.

DETAILED DESCRIPTION

Figure 1:
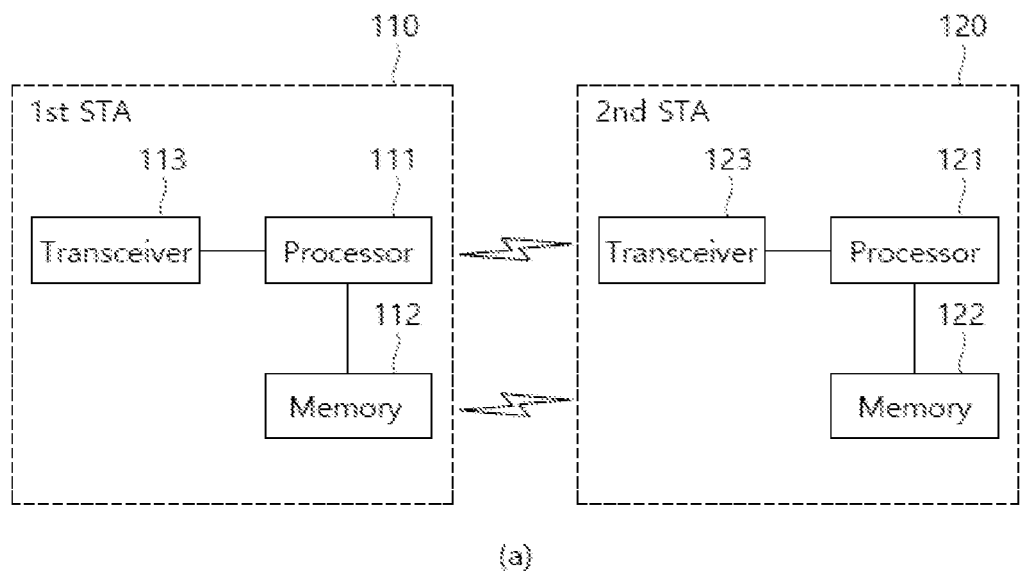
FIG. 1 shows an example of a transmitting apparatus and/or receiving apparatus of the present specification.
Figure 1:
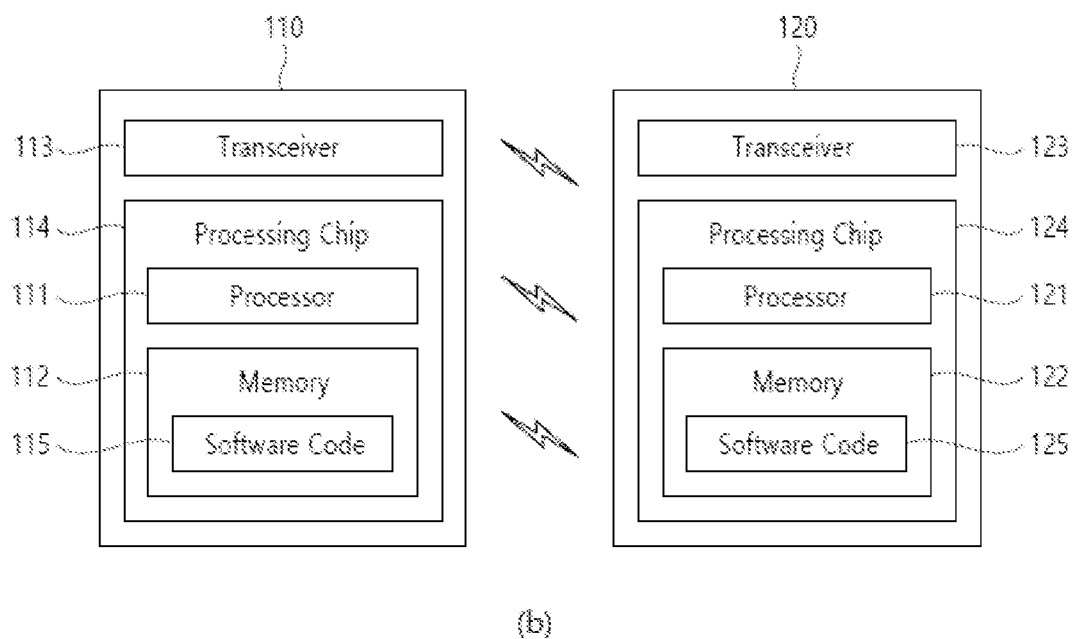

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
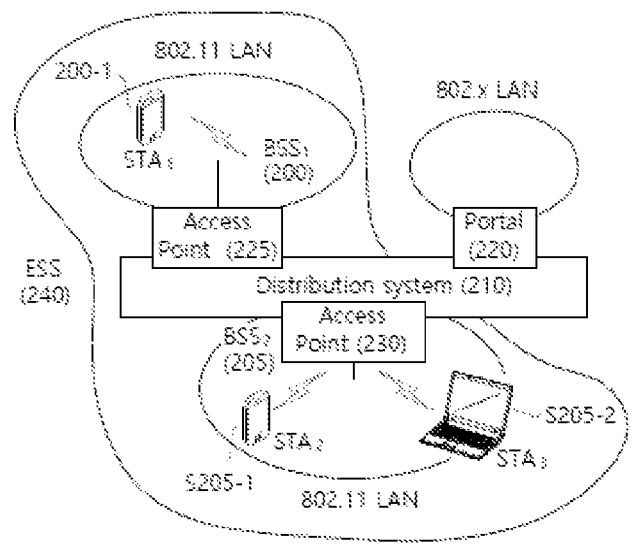
FIG. 2 is a conceptual view illustrating the structure of a wireless local area network (WLAN).
Figure 2:
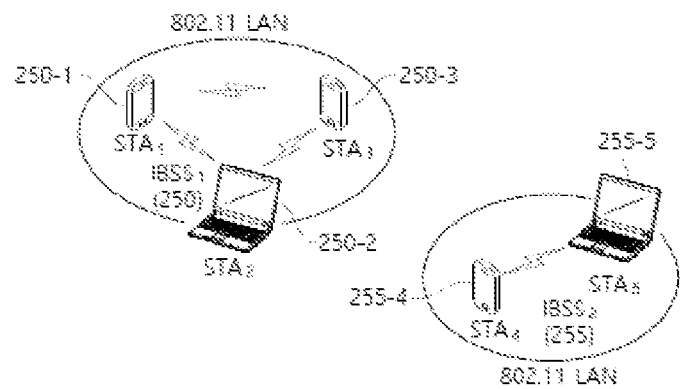

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
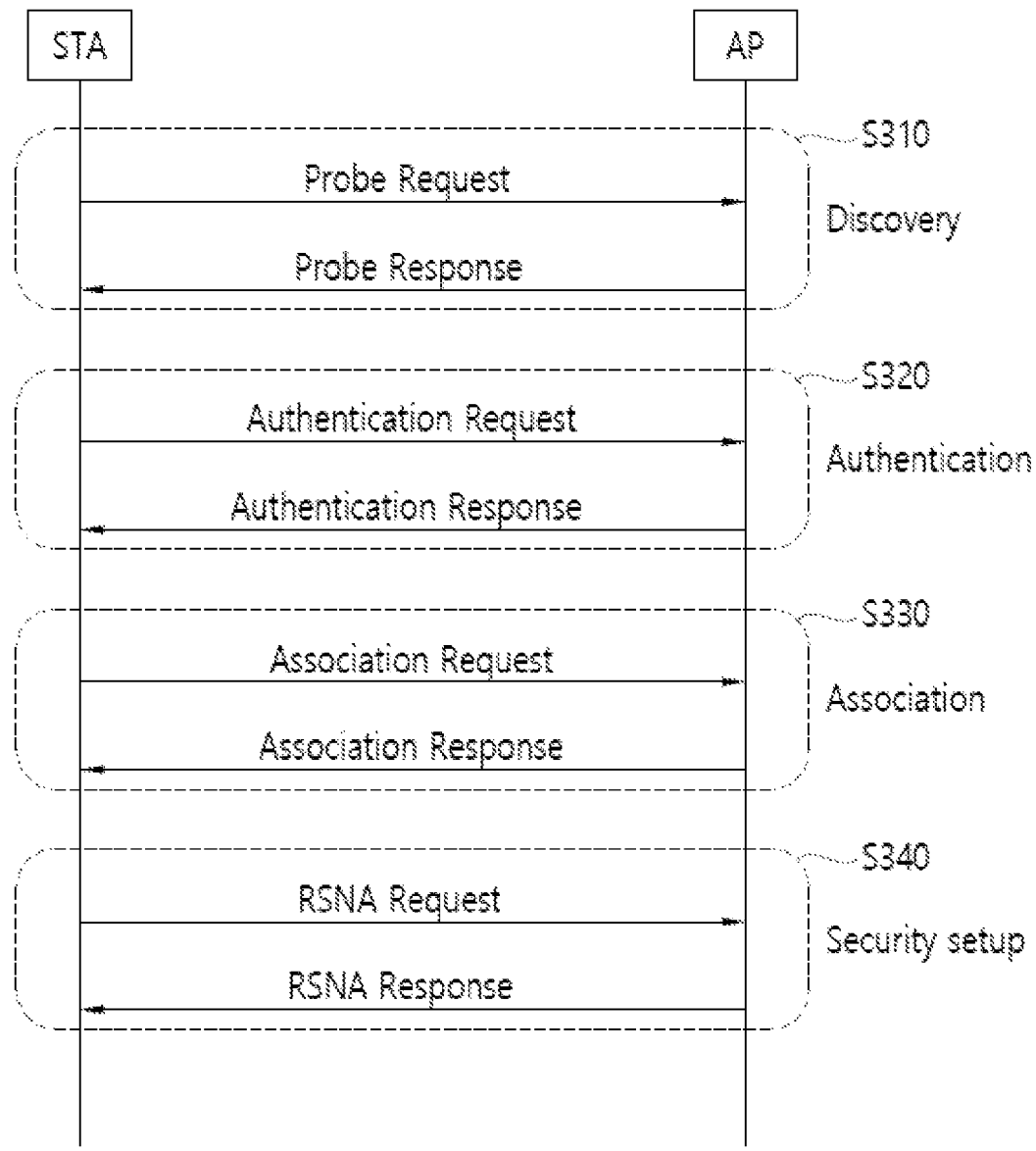
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
FIG. 4 illustrates an example of a PPDU used in an IEEE standard.
Figure 4:
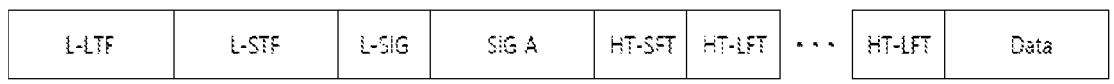
Figure 4:
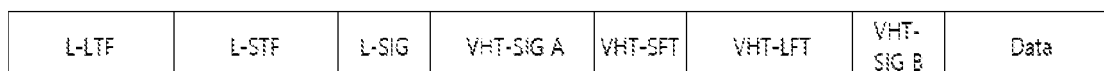
Figure 4:
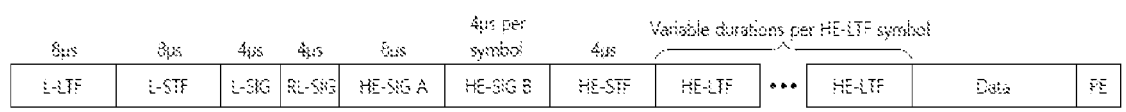

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 us).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
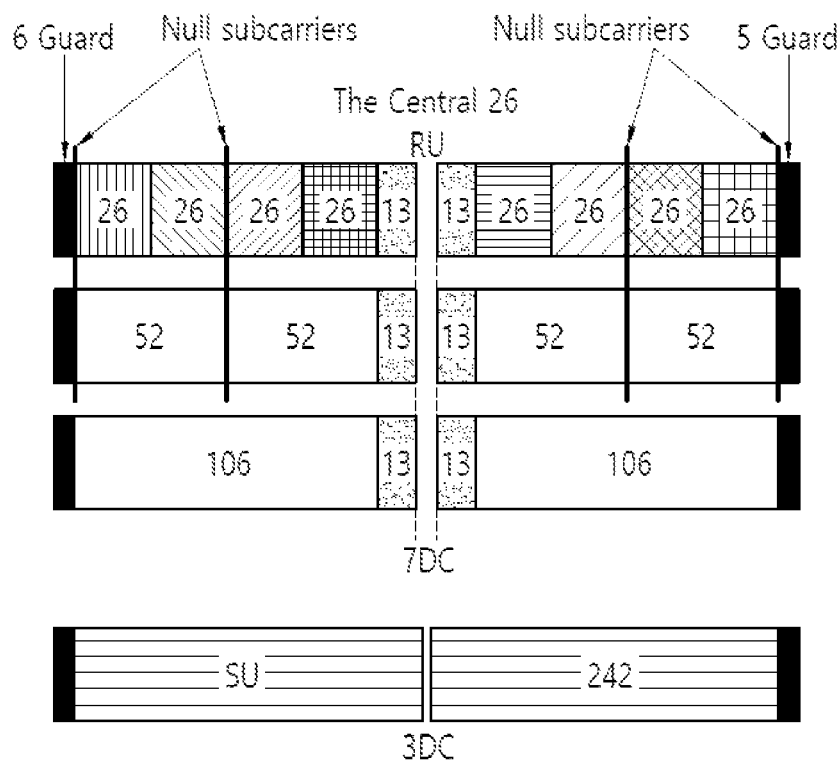
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
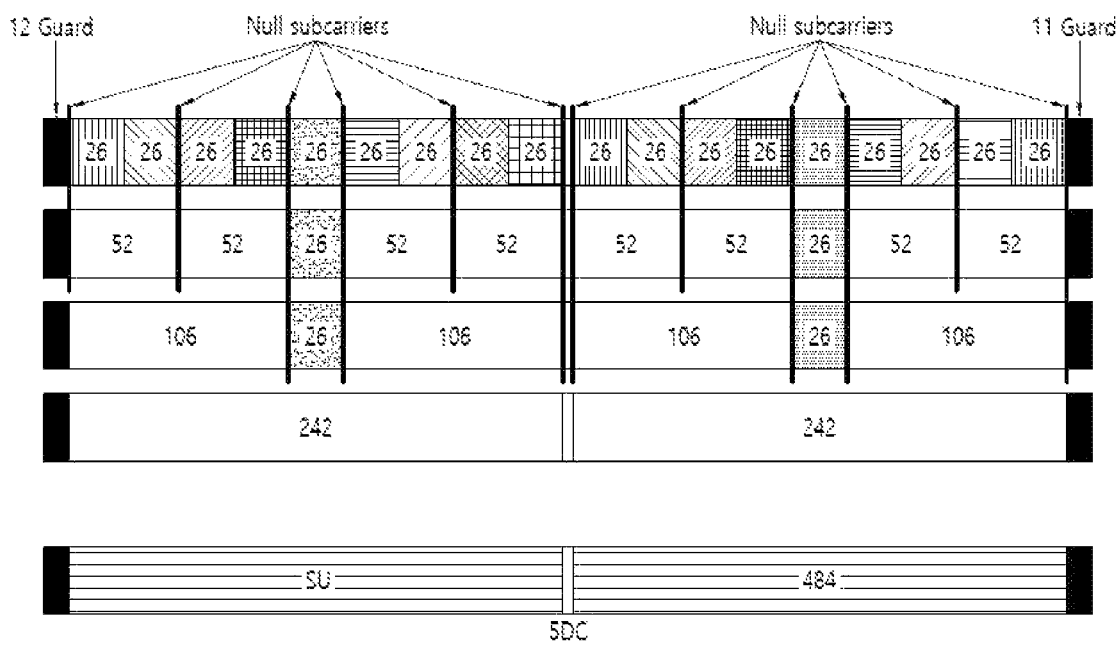
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
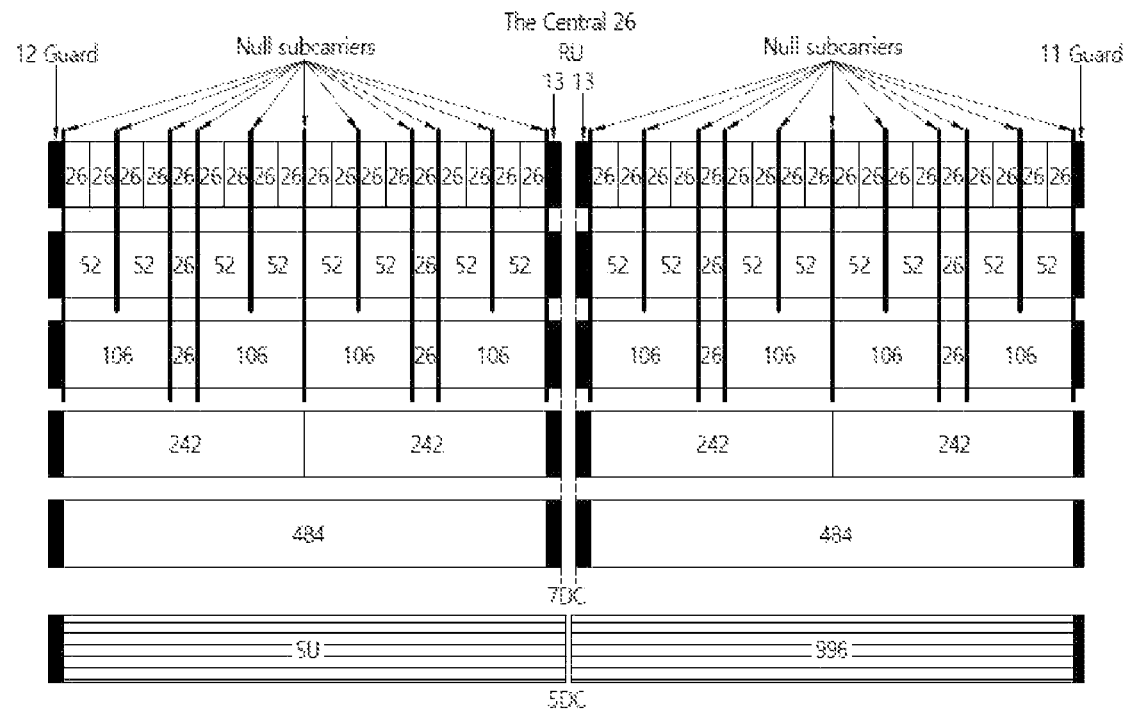
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
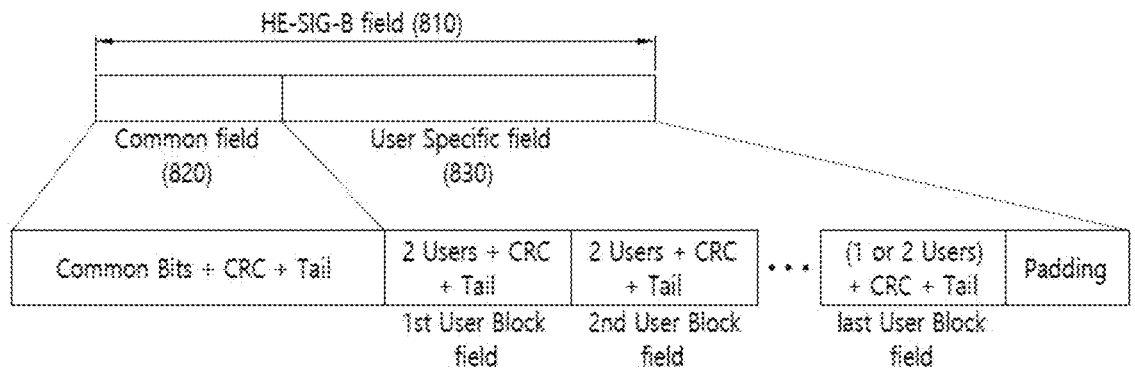
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as shown in FIG. 37.

As shown the example of FIG. 5, up to nine 26-RUs may be allocated to the 20 MHz channel. When the RU allocation information of the common field 820 is set to "00000000" as shown in FIG. 37, the nine 26-RUs may be allocated to a corresponding channel (i.e., 20 MHz). In addition, when the RU allocation information of the common field 820 is set to "00000001" as shown in FIG. 37, seven 26-RUs and one 52-RU are arranged in a corresponding channel. That is, in the example of FIG. 5, the 52-RU may be allocated to the rightmost side, and the seven 26-RUs may be allocated to the left thereof.

The example of FIG. 37 shows only some of RU locations capable of displaying the RU allocation information.

For example, the RU allocation information may include an example of FIG. 38.

"01000y2y1y0" in FIG. 38 relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
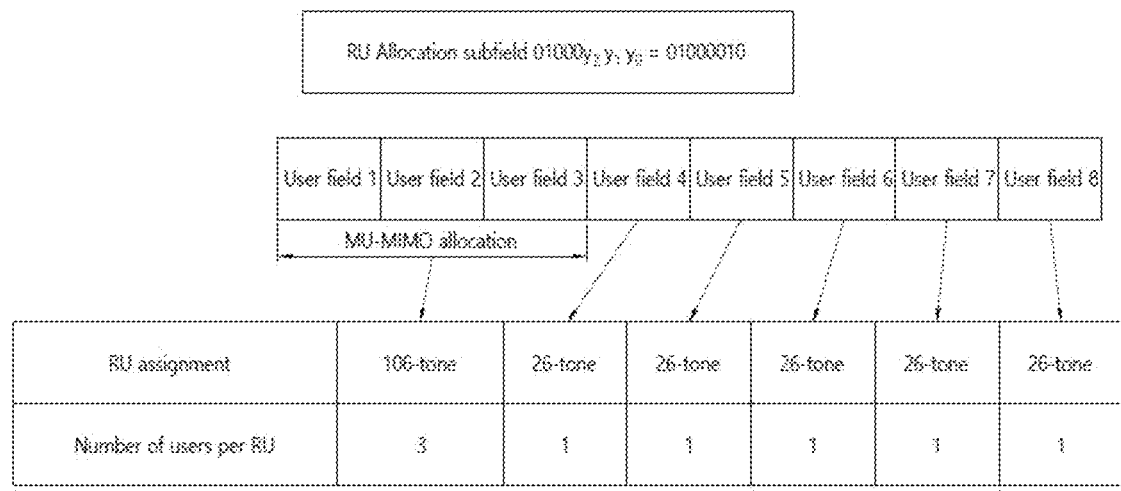
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows:

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in FIG. 39 and FIG. 40.

As shown in FIG. 39 and/or FIG. 40, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in FIG. 39. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of FIG. 39 and/or FIG. 40, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
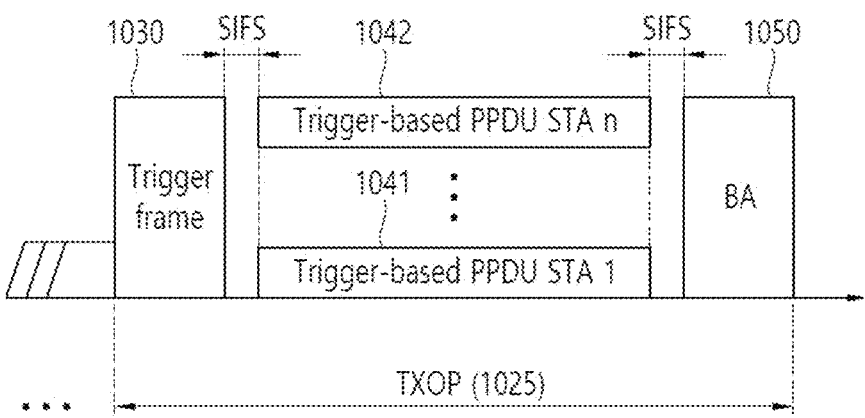
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
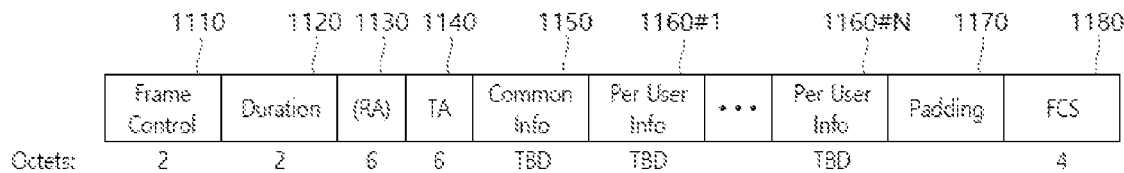
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
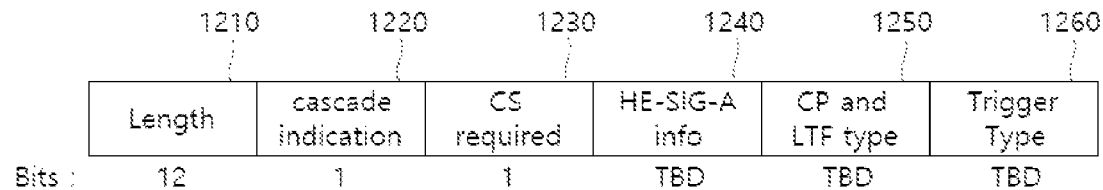
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
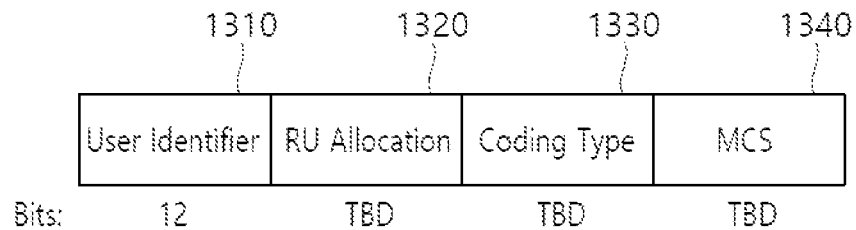
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
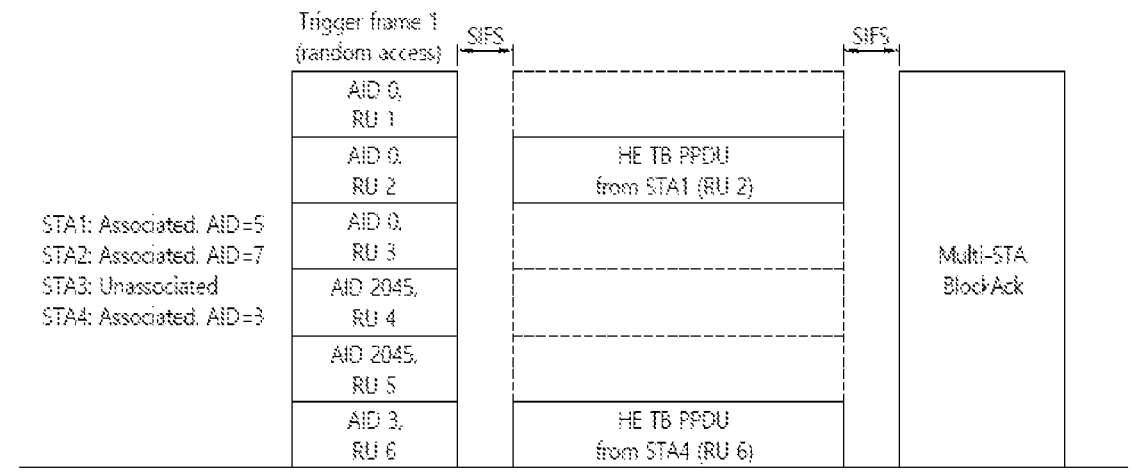
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID-0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
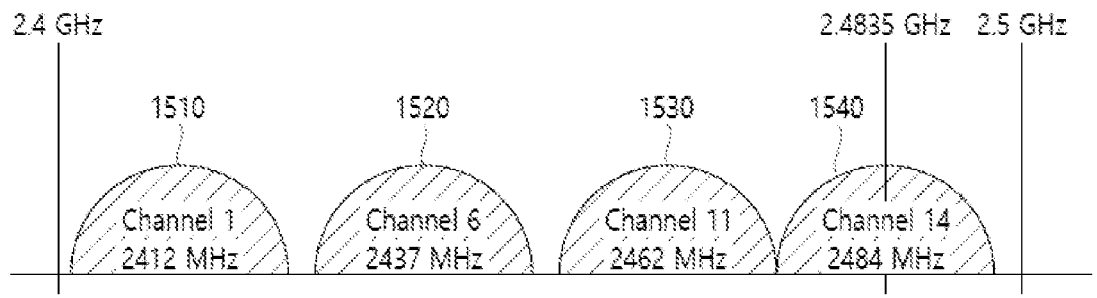
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHZ) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
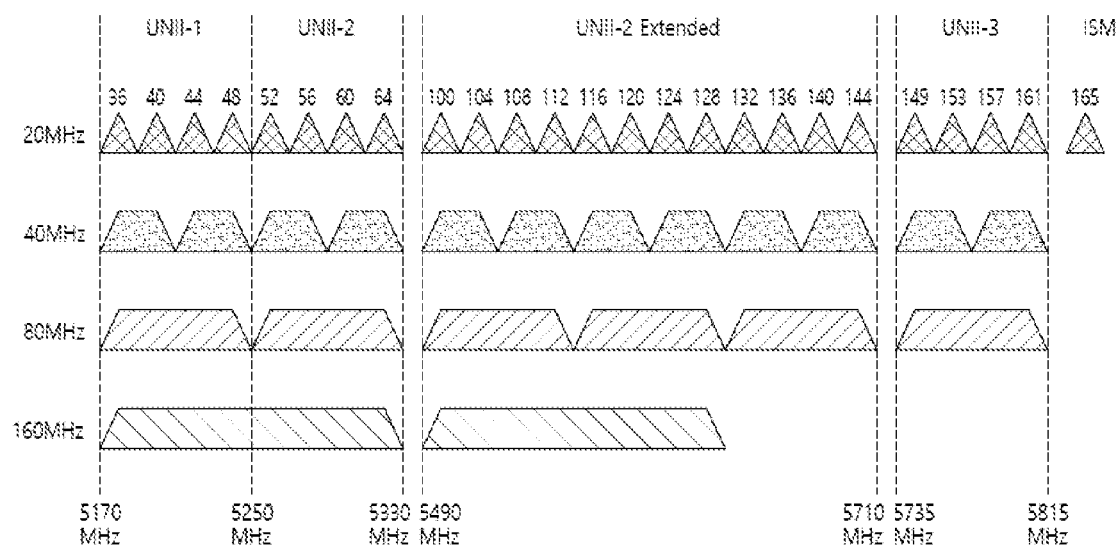
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHZ and less than 6 GHZ (or less than 5.9 GHZ) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHZ, 160 MHZ, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
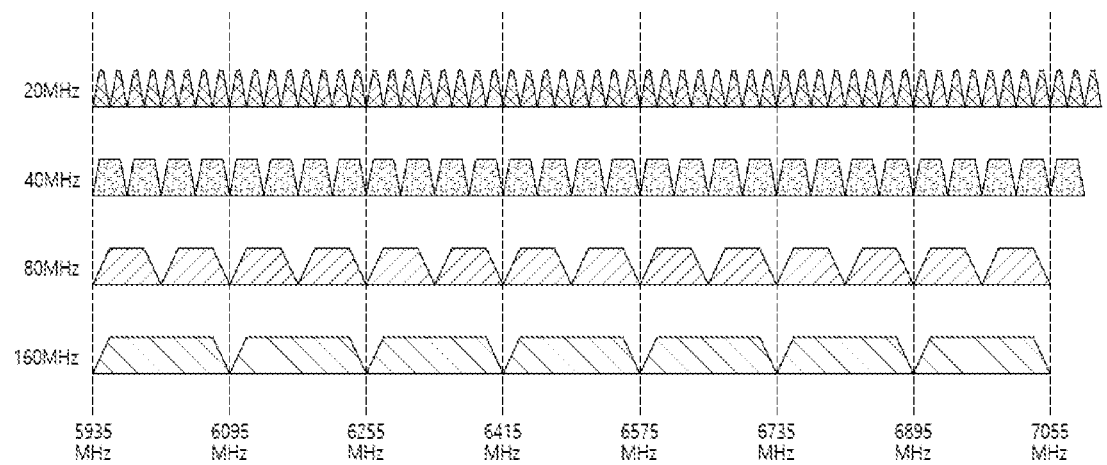
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
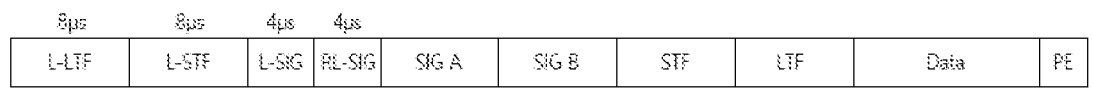
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHZ, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in FIG. 37.

The example of FIG. 41 to FIG. 43 is an example of 8-bit (or N-bit) information for various RU allocations. An index shown in each figure may be modified, and some entries in FIG. 41 to FIG. 43 may be omitted, and entries (not shown) may be added.

The example of FIG. 41 to FIG. 43 relates to information related to a location of an RU allocated to a 20 MHz band. For example, 'an index 0' of FIG. 41 may be used in a situation where nine 26-RUs are individually allocated (e.g., in a situation where nine 26-RUs shown in FIG. 41 are individually allocated).

Meanwhile, a plurality or RUs may be allocated to one STA in the EHT system. For example, regarding 'an index 60' of FIG. 42, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 us, and a periodicity signal of 0.8 us may be repeated 5 times to become a first type STF having a length of 4 us. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 us, and a periodicity signal of 1.6 us may be repeated 5 times to become a second type STF having a length of 8 us. Hereinafter, an example of a sequence for configuring an EHT-STF (i.e., an EHT-STF sequence) is proposed. The following sequence may be modified in various ways.

The EHT-STF may be configured based on the following sequence M.

$$M = \{-1, -1, -1, 1, 1, 1, -1, 1, 1, 1, -1, 1, 1, -1, 1\} \quad \text{<Equation 1>}$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT-STF(-112:16:112) = \{M\} * (1 + j)/sqrt(2) \quad \text{<Equation 2>}$$
$$EHT-STF(0) = 0$$

The EHT-STF for the 40 MHz PPDU may be configured based on the following equation. The following example may be the first type (i.e., 1×STF) sequence.

$$EHT-STF(-240:16:240) = \{M, 0, -M\} * (1 + j)/sqrt(2) \quad \text{<Equation 3>}$$

The EHT-STF for the 80 MHz PPDU may be configured based on the following equation. The following example may be the first type (i.e., 1×STF) sequence.

$$EHT-STF(-496:16:496) =  \quad \text{<Equation 4>}$$
$$\{M, 1, -M, 0, -M, 1, -M\} * (1 + j)/sqrt(2)$$

The EHT-STF for the 160 MHz PPDU may be configured based on the following equation. The following example may be the first type (i.e., 1×STF) sequence.

$$EHT-STF(-1008:16:1008) =  \quad \text{<Equation 5>}$$
$$\{M, 1, -M, 0, -M, 1, -M, 0, -M,$$
$$-1, M, 0, -M, 1, -M\} * (1 + j)/sqrt(2)$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT-STF(-496:16:496) =  \quad \text{<Equation 6>}$$
$$\{-M, -1, M, 0, -M, 1, -M\} * (1 + j)/sqrt(2)$$

Equation 7 to Equation 11 below relate to an example of a second type (i.e., 2×STF) sequence.

$$EHT-STF(-120:8:120) = \{M, 0, -M\} * (1 + j)/sqrt(2) \quad \text{<Equation 7>}$$

The EHT-STF for the 40 MHz PPDU may be configured based on the following equation.

$$EHT-STF(-248:8:248) =  \quad \text{<Equation 8>}$$
$$\{M, -1, -M, 0, M, -1, M\} * (1 + j)/sqrt(2)$$
$$EHT-STF(-248) = 0$$
$$EHT-STF(248) = 0$$

The EHT-STF for the 80 MHz PPDU may be configured based on the following equation.

$$EHT-STF(-504:8:504) =  \quad \text{<Equation 9>}$$
$$\{M, -1, M, -1, -M, -1, M, 0, -M,$$
$$1, M, 1, -M, 1, -M\} * (1 + j)/sqrt(2)$$

The EHT-STF for the 160 MHz PPDU may be configured based on the following equation.

$$EHT-STF(-1016:16:1016) =  \quad \text{<Equation 10>}$$
$$\{M, -1, M, -1, -M, -1, M, 0, -M, 1, M,$$
$$1, -M, 1, -M, 0, -M, 1, -M, 1, M, 1, -M,$$
$$0, -M, 1, M, 1, -M, 1, -M\} * (1 + j)/sqrt(2)$$
$$EHT-STF(-8) = 0, EHT-STF(8) = 0,$$
$$EHT-STF(-1016) = 0, EHT-STF(1016) = 0$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504:8:504) = \qquad \text{<Equation 11>}$$
$$\{M, -1, -M, 1, M, 1, -M, 0, -M, 1, M, 1, -M, 1, -M\}*$$
$$(1+j)/sqrt(2)$$
$$EHT\text{-}STF(-504) = 0,$$
$$EHT\text{-}STF(504) = 0$$

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 us. In addition, a GI (e.g., 0.8/1/6/3.2 us) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
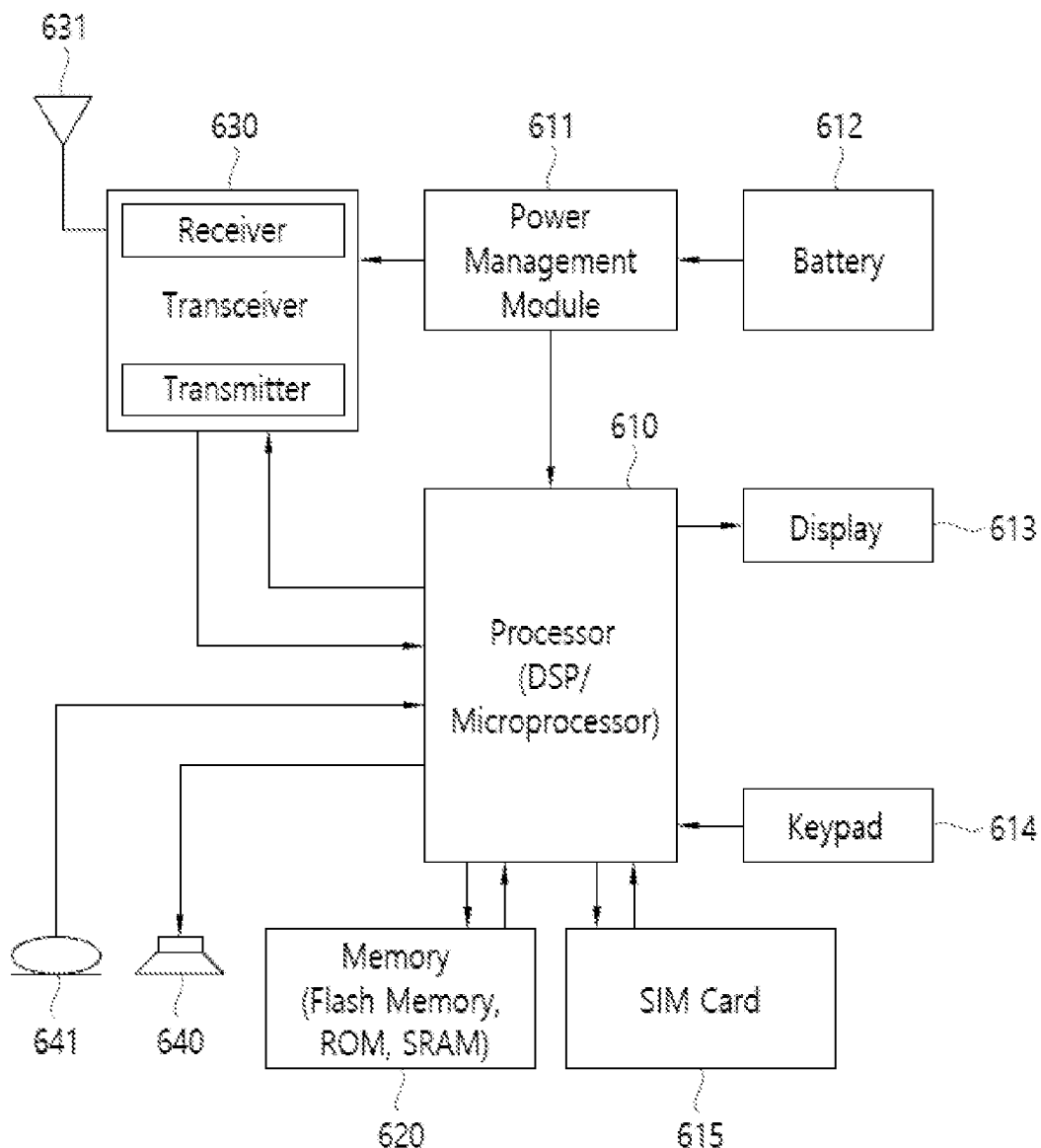
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
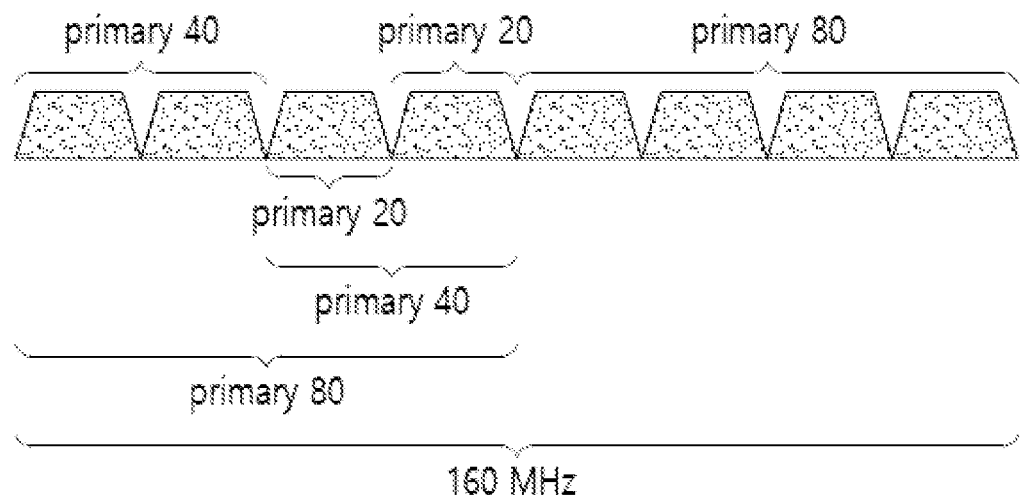
FIG. 20 illustrates an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 20, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHZ/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

In extreme high throughput (EHT), a standard being discussed after IEEE802.11ax, the introduction of HARQ is being considered. When HARQ is introduced, coverage can be expanded in a low signal to noise ratio (SNR) environment, that is, in an environment where the distance between the transmitting terminal and the receiving terminal is long, and higher throughput may be obtained in a high SNR environment.

The device described below may be the apparatus of FIGS. 1 and/or 19, and the PPDU may be the PPDU of FIG. 18. A device may be an AP or a non-AP STA. The device described below may be an AP multi-link device (MLD) supporting multi-link or a non-AP STA MLD.

In extremely high throughput (EHT), a standard being discussed after 802.11ax, a multi-link environment using one or more bands at the same time is being considered. When the device supports multi-link or multi-link, the device may use one or more bands (for example, 2.4 GHZ, 5 GHZ, 6 GHz, 60 GHz, etc.) simultaneously or alternately.

Hereinafter, although described in the form of multi-link, the frequency band may be configured in various other forms. In this specification, terms such as multi-link, multi-link, and the like may be used, however, for the convenience of the description below, some embodiments may be described based on multi-link.

In the following specification, an MLD refers to a multi-link device. The MLD has one or more connected STAs and one MAC service access point (SAP) that connects to an upper link layer (Logical Link Control, LLC). An MLD may mean a physical device or a logical device. Hereinafter, a device may mean an MLD.

In the following specification, a transmitting device and a receiving device may refer to an MLD. The first link of the receiving/transmitting device may be a terminal (for example, STA or AP) that performs signal transmission/reception through the first link included in the receiving/transmitting device. The second link of the receiving/transmitting device may be a terminal (for example, STA or AP) that performs signal transmission/reception through the second link included in the receiving/transmitting device.

IEEE802.11be can support two types of multi-link operations. For example, simultaneous transmit and receive (STR) and non-STR operations may be considered. For example, an STR may be referred to as an asynchronous multi-link operation, and a non-STR may be referred to as a synchronous multi-link operation. A multi-link may include a multi-band. That is, the multi-link may mean links included in several frequency bands, or may mean a plurality of links included in one frequency band.

EHT (11be) may consider multi-link technology, where multi-link may include multi-band. That is, the multi-link may represent links of several bands and at the same time may represent several multi-links within one band. Two types of multi-link operations are being considered. The asynchronous operation that enables simultaneous TX/RX on multiple links and synchronous operation that is not possible are considered. Hereinafter, the capability that enables simultaneous reception and transmission in multiple links is called STR (simultaneous transmit and receive), a STA having STR capability is called a STR MLD (multi-link device), and a STA not having STR capability is called a non-STR MLD.

Figure 21:
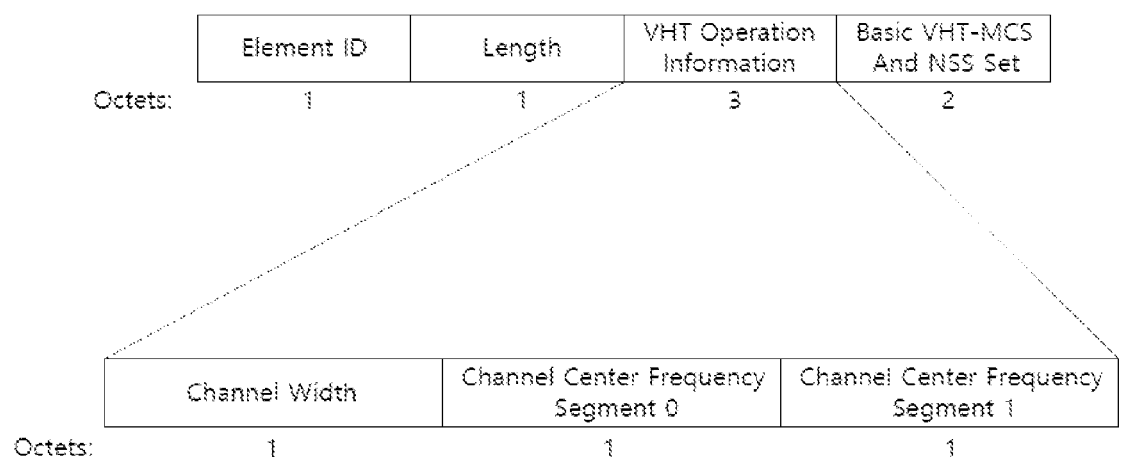
FIG. 21 illustrates an example of a VHT operation element format.

FIG. 21 illustrates an example of a VHT operation element format.

An operation of a VHT STA in a BSS is controlled by an HT operation element and a VHT operation element of FIG. 18.

In addition, the VHT STA obtains primary channel information from the HT operation element. A VHT operation information subfield of FIG. 21 may be defined as shown in FIG. 44.

When a channel width subfield of the VHT operation information subfield is set to 1, a BSS bandwidth may be 80 MHz, 160 MHz, or 80+80 MHz. In this case, the BSS bandwidth based on a value of a channel center frequency segment (CCFS) 1 subfield may be defined as as shown in FIG. 45.

In this case, CCF (Channel Center Frequency, MHz unit) may be obtained as "channel starting frequency+ 5*dot11CurrentChannelCenterFrequencyIndex".

Figure 22:
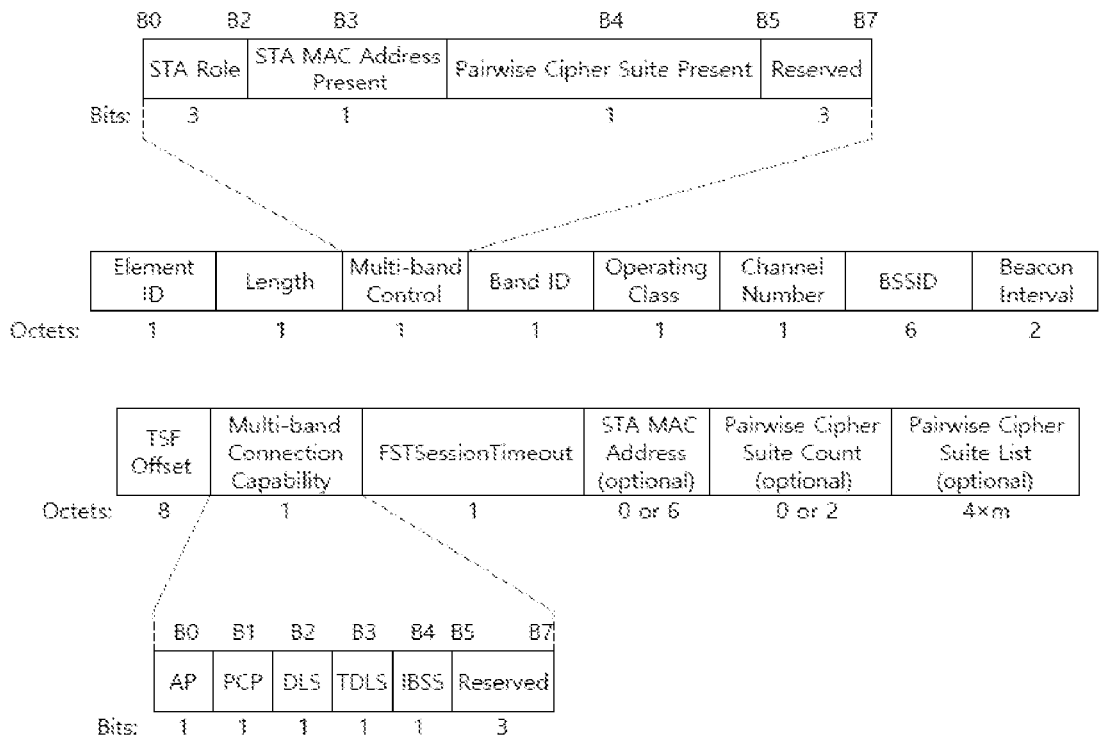
FIG. 22 illustrates an example of a multi-link element format.

FIG. 22 illustrates an example of a multi-link element format.

A multi-link element of FIG. 22 may indicate that an STA transmitting this element is included in a multi-link device which may operate in a frequency band or an operating class or a channel other than a channel through which the element is transmitted.

In addition, the multi-link element of FIG. 22 may include a multi-link control field. The multi-link control field may include STA Role, STA MAC Address Present, Pairwise Cipher Suite Present, Reserved fields, etc.

In addition, the multi-link element of FIG. 22 may include a multi-link connection capability field. The multi-link connection capability field may include AP, PCP, DLS, TDLS, IBSS, Reserved fields, etc.

EHT PHY

Hereinafter, functional blocks of EHT PHY are described.

Channelization and Tone Plan 802.11be supports 320 MHz and 160+160 MHz PPDUs. 802.11be supports 240 MHZ and 160+80 MHz transmission. Whether 240/160+80 MHz is configured by 80 MHz channel puncturing of 320/160+160 MHz is undecided. The 240/160+80 MHz bandwidth consists of three 80 MHz channels, including primary 80 MHz. 802.11be reuses an 802.11ax tone plan for 20/40/80/160/80+80 MHz PPDUs. In case of 320 MHz and 160+160 MHz PPDUs, 802.11be uses duplicated HE160 in the OFDMA tone plan. 802.11be 240/160+80 MHz transmission consists of 3×80 MHz segments, and a tone plan for each 80 MHz segment is the same as HE80 in 802.11ax. A 160 MHz tone plan is duplicated for a non-OFDMA tone plan of the 320/160+160 MHz PPDU. The 160 MHz tone plan is undecided. An 802.11be 320/160+160 MHz non-OFDMA tone plan uses the duplicated tone plan of HE 160. A puncturing design is undecided. For the non-OFDMA tone plan of 320/160+160 MHz PPDU, 12 and 11 null tones are deployed respectively at left and right edges of the 160 MHz segment. In a data part of the EHT PPDU, 802.11be uses the same subcarrier spacing as in an 802.11ax data part.

Resource Unit 802.11be shall allow one or more RUs to be allocated to a single STA.

Coding and interleaving schemes for multiple RUs allocated to the single STA are undecided.

The maximum number (>1) of RUs allocated to the single STA is also undecided.

L-STF, L-LTF, L-SIG, and RL-SIG

In case of the EHT PPDU, L-STF, L-LTF, and L-SIG shall be transmitted at the beginning of the EHT PPDU.

In case of the EHT PPDU, a first symbol after the L-SIG is BPSK modulation.

A length field of the L-SIG is set to a value N satisfying mod (N, 3)=0.

Phase rotation is applied to a legacy preamble part of the EHT PPDU.

A coefficient applied to each 20 MHz channel is undecided.

Applying to other parts is undecided.

The EHT PPDU shall have an RL-SIG field, which is a repetition of the L-SIG field, immediately after the L-SIG field.

U-SIG

A jointly encoded U-SIG having a length of 2 OFDM symbols shall be present in an EHT preamble immediately after the RL-SIG.

A version-independent field is included in the U-SIG. The purpose of version-independent content is to achieve better coexistence between future 802.11 generations.

In addition, the U-SIB may have some version-dependent fields.

In case of an extended range mode (when this mode is adopted), a size of the U-SIG is undecided.

The U-SIG is transmitted using 52 data tones and 4 pilot tones per 20 MHz.

The U-SIG is modulated in the same manner as in the HE-SIG-A field of 802.11ax.

An extended range SU mode is undecided.

A version-independent bit and a version-dependent bit are included in the U-SIG.

Figure 23:
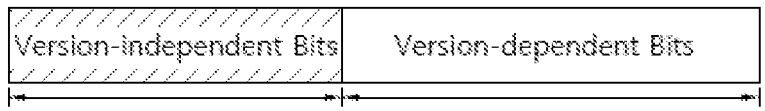
FIG. 23 illustrates an embodiment of U-SIG.

FIG. 23 illustrates an embodiment of the U-SIG.

Referring to FIG. 23, a version-independent bit has a static position and bit definition in various generations/PHY versions. A version-dependent bit may have a variable bit definition in each PHY version.

The U-SIG shall include a version-independent field as follows.

PHY version identifier: 3 bits

UL/DL flag: 1 bit

A PHY version identifier field is one of version-independent fields of the U-SIG.

The purpose thereof is to simplify automatic detection for a future 802.11 generation. That is, a value of this field is used to identify an exact PHY version starting with 802.11be.

An exact location of this field is undecided.

In the U-SIG field, a version-independent bit part includes the following bit.

BSS color, the number of bits is undecided.

TXOP duration, the number of bits is undecided.

EHT-SIG

An EHT PPDU transmitted to multiple users shall have a variable MCS and a variable-length EHT-SIG immediately after the U-SIG.

A common field and a per-user field shall be present in the EHT-SIG (immediately after the U-SIG) of the EHT PPDU transmitted to multiple users.

In a special case, a compression mode (e.g., entire BW MU-MIMO) is undecided.

Preamble Puncture

The 802.11be amendment shall support a preamble puncturing mechanism for an EHT PPDU transmitted to multiple STAs.

The 802.11be amendment shall support a preamble puncturing mechanism for an EHT PPDU transmitted to a single STA.

EHT MAC

A function block of EHT MAC is described in this section.

The 802.11be amendment shall define a mechanism for an AP to support an STA which communicates with another STA.

Multi-Band and Multichannel Aggregation and Operation

Capabilities related to multi-band and multi-channel aggregation and operation are described in this section.

MLD (Multi-link Device): a device which has one or more affiliated STAs and has one MAC SAP to LLC, including one MAC data service.

Note 1—The device may be logical in concept.

Note 2—It is undecided that only one STA exists in an MLD.

Note 3—Whether the WM MAC address of each STA affiliated with the MLD is the same or different is undecided.

AP multi-link device (AP MLD): an MLD, where each STA affiliated with the MLD is an AP.

Non-AP multi-link device (non-AP MLD): an MLD, where each STA affiliated with the MLD is a non-AP STA.

Multi-Link Operation

Capabilities related to a multi-link operation are described in this section.

MLD (Multi-link Device): a device which has one or more affiliated STAs and has one MAC SAP to LLC, including one MAC data service.

Note 1—The device may be logical in concept.

Note 2—It is undecided that only one STA exists in an MLD.

Note 3—Whether the WM MAC address of each STA affiliated with the MLD is the same or different is undecided.

AP multi-link device (AP MLD): an MLD, where each STA affiliated with the MLD is an AP.

Non-AP multi-link device (non-AP MLD): an MLD, where each STA affiliated with the MLD is a non-AP STA.

Multi-Link Setup

An MLD has a MAC address which identifies an MLD management entity.

For example, the MAC address may be used in multi-link setup between a non-AP MLD and an AP MLD.

A value of an RA/TA field transmitted wirelessly in a MAC header of a frame is a MAC address of an STA affiliated with an MDL corresponding to that link.

The MAC address of each affiliated AP within an AP MLD shall be different from each other except for a case where a MAC access property is undecided when the affiliated AP cannot perform simultaneous transmission (TX)/reception (RX) operation (e.g., due to near band in-device interference).

Note 1—Whether to accept an operation of an AP MLD without the simultaneous TX/RX operation is undecided.

802.11be defines a multi-link setup signal exchange executed through one link initiated by a non-AP MLD with an AP MLD.

Capabilities for one or more links may be exchanged during the multi-link setup.

The AP MLD plays a role of an interface for a DS for a non-AP MLD after the multi-link setup is successful.

Note 1—A link identification is undecided.

Note 2—Details for a non-infrastructure operation mode are undecided.

An MLD may indicate capabilities for simultaneously supporting frame exchange from a set of affiliated STAs to another MLD.

A new element is defined as a container which advertises and exchanges capability information for the multi-link setup.

802.11be supports a mechanism for a multi-link operation.

An AP affiliated with an AP MLD may indicate capabilities and operational parameters for one or more STAs of a multi-link device.

A non-AP STA affiliated with a non-AP MLD may indicate capabilities for one or more non-AP STAs of a non-AP MLD.

Specific information for the capabilities and operational parameters of the multi-link device is undecided.

An MLD which supports multiple links may announce whether it can support transmission on one link simultaneously with reception on the other link for each pair of links.

Note 1—Two links are present in different channels.

Note 2—Whether to define capabilities for announcing whether it can support transmission on one link simultaneously with transmission on the other link is undecided.

802.11be defines a mechanism for a multi-link operation enabling the followings.

Capabilities and operational parameters for multiple links of the AP MLD are indicated.

Capabilities and operational parameters for multiple links are negotiated while exchanging a single setup signal.

802.11be defines a mechanism for canceling the existing multi-link setup agreement.

After the multi-link setup between two MLDs, different GTKs/IGTKs/BIGTKs of different links having different PN spaces are used.

The GTKs/IGTKs/BIGTKs of the different links may be delivered with one 4-way handshake.

TID-to-Link Mapping 802.11be defines a direction-based TID-to-link mapping mechanism among setup links of an MLD.

Basically, after the multi-link setup, all TIDs are mapped to all setup links.

The multi-link setup may include the TID-to-link mapping negotiation.

TID-to-link mapping may have the same or different link sets for each TID unless a non-AP MLD indicates that it is necessary to use the same link set for all TIDs during the multi-link setup phase.

Note—This indication method performed by the non-AP MLD is undecided (implicit or explicit).

The TID-to-link mapping may be updated after the multi-link setup through a negotiation which may be initiated by any MLD.

TBD Format

Note—When a responding MLD is not able to accept the update, TID-to-link mapping update may be rejected.

At any point in time, a TID shall always be mapped to at least one link which is set up, unless admission control is used.

A link which is set as part of the multi-link setup is defined as being enabled when the link can be used in a frame exchange and at least one TOD is mapped to the link.

Note—The frame exchange of the link varies depending on a power state of a corresponding non-AP STA.

A management frame is allowed on all enabled links according to a base line.

When a TID is mapped in UL to a set of enabled links for a non-AP MLD, the non-AP MLD may use all links in the set of enabled links to transmit a data frame in the TID.

When a TID is mapped in DL to a set of enabled links for a non-AP MLD:

the non-AP MLD may retrieve buffered Bus corresponding to the TID on any links within this set of enabled links.

The AP MLD may transmit a data frame in the TID by using all links in the set of enabled links according to the existing constraint for frame transmission applied to the enabled link.

An example of the constraint is a case where an STA is in a sleep state.

802.11be defines a mechanism for a multi-link operation enabling the followings.

It is an operational mode for simultaneously exchanging a frame in one or more links for one or more TIDs.

It is an operational mode which restricts an exchange frame of one or more TID(s) in one link at a time.

A single block acknowledge agreement is negotiated between two MLDs for a TID which may be transmitted through one or more links.

Note—A format of a setup frame is undecided.

A block agreement for the multi-link operation is set by using ADDBA request and ADDBA response frames.

The established block acknowledge agreement allows a QoS data frame of the TID, aggregated within an A-MPDU, to be exchanged between the two MLDs of any available link.

For each block acknowledge agreement, there exists one receive reordering buffer based on MPDUs of an MLD which is a recipient of a QoS data frame for that block acknowledge agreement.

The receive reordering buffer operation is based on a sequence number space which is shared between the two MLDs.

A receive status of a QoS data frame of a TID received on a link may be signaled on the same link, and may be signaled on other available link(s).

A sequence number is allocated in a common sequence number space shared in multiple links of an MLD for a TID which may be transmitted to a peer MLD through one or more links.

Power Save

For each of the enabled links, frame exchanges are possible when the corresponding non-AP STA of the enabled link is in the awake state.

Note 1—A link is enabled when it can be used to exchange a frame according to an STA power state.

Note 2—A frame exchange is impossible when a link is disabled (i.e., not enabled) by an MLD.

An AP of an AP MLD may transmit on a link a frame which carries an indication of data buffered for transmission on other enabled link(s).

An AP MLD may recommend a non-AP MLD to use one or more enabled links.

An indication of the AP may be carried on a broadcast or unicast frame.

For a link setup between an AP MLD and a non-AP MLD, a non-AP STA operating on that link may send to an AP operating on that link an indication for (an)other non-AP STA(s) within the same non-AP MLD. A non-AP MLD which has transitioned to a sleep state is in an awake state.

The non-AP MLD monitors and performs a basic operation (e.g., traffic indication, BSS parameter update, etc.) on one or more links.

Each non-AP STA affiliated with a non-AP MLD which is operating on an enabled link maintains its own power state/mode.

Multi-Link Channel Access 802.11be shall allow the following asynchronous multi-link channel access.

Each of STAs belonging to an MLD performs a channel access through their links independently in order to transmit frames.

Downlink and uplink frames may be transmitted simultaneously through multiple links.

802.11be shall allow an MLD, which has a constraint, to simultaneously perform transmission and reception on a pair of links and operate through this pair of links.

A signal of such a constraint is undecided.

Multi-AP Operation

Capabilities related to a multi-AP operation are described in this section.

Joint NDP Sounding 802.11be provides a joint NDP sounding scheme as an optional mode for a multi-AP system.

A sequential sounding scheme in which each AP transmits NDP independently and sequentially without overlapped sounding period of each AP may also be used in the multi-AP system.

A joint NDP sounding scheme for the multi-AP system, of which the total number of antenna is less than or equal to 8 in an AP, enables all antennas in all LTF tones and uses an 802.11ax P matrix in an OFDM symbol.

Although there are existing APs supporting two or more bands at the same time, the APs are actually the same only in physical location, and are used by being established as separate BSSs. Therefore, the APs have communicated with respective STAs for each BSS.

Currently, 802.11ax has extended a supported transmission band to 6 GHZ, and 802.11be, which is currently under standardization, is also scheduled to support the 6 GHz band. A device supporting 5 GHz and 6 GHz may operate an antenna/RF chain exclusively for each band as it has operated up to now, but may configure a shared antenna/RF chain capable of supporting both 5 GHz and 6 GHz due to a constraint of a device space.

When an increasing number of APs operating 5 GHz and 6 GHz are deployed and STAs also operate a shared antenna/RF chain capable of supporting 5 GHz and 6 GHz, a band and channel negotiation process between the APs and the STAs is necessary for flexible and efficient transmission and reception.

The present specification proposes a band negotiation process for each antenna/RF chain in a process in which an STA using a shared antenna/RF chain capable of supporting multiple bands performs transmission and reception with an AP. To this end, the present disclosure also proposes a method for exchanging pieces of information on antenna/RF chains of an AP and a STA with each other in an association time.

Although a frequency band is described in the form of multilink in the specification described below, the frequency band may be configured in various forms. That is, although multi-band, multi-link, or the like may be used in the present specification, hereinafter, for convenience of description, some examples are described based on multi-link.

Although the number of links in a multi-link environment is indicated as two in the specification described below, it is also equally applicable to a case where the number of links is greater than two. Hereinafter, for convenience of description, some examples are described based on a multi-link environment in which the number of links is two.

In the following specification, an MLD refers to a multi-link device. The MLD has one or more associated STAs and has one MAC service access point (SAP) which connects to an upper link layer (logical link control (LLC)). The MLD may refer to a physical device or a logical device.

1. Operational Procedure

It is necessary to exchange information on a shared antenna/RF chain between an AP MLD and a non-AP MLD first in an AP MLD and non-AP MLD association process or in a subsequent process. The information may be indicated through an appropriate element in an association request/response exchange process or may also be indicated in advance through a neighbor report or beacon frame.

Figure 24:
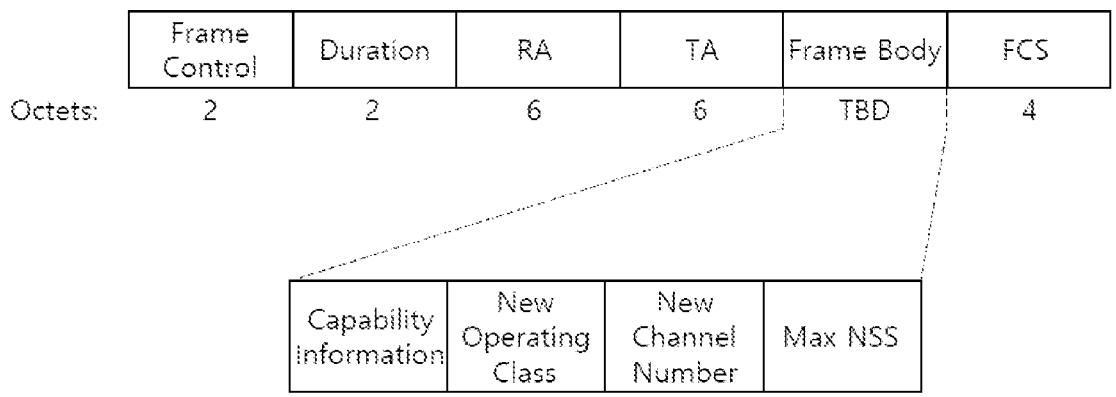
FIG. 24 and FIG. 25 illustrate an embodiment of an operating band negotiation request frame format.
Figure 25:
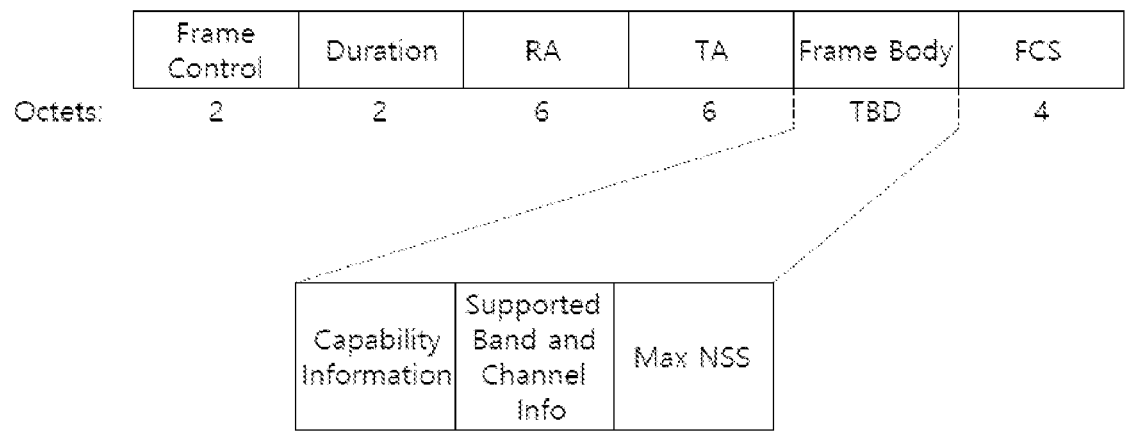

FIG. 24 and FIG. 25 illustrate an embodiment of an operating band negotiation request frame format.

When an AP MLD and a non-AP MLD are aware of information on each other's antenna/RF chains through the aforementioned method, if the non-AP MLD using a shared antenna/RF chain desires to change an operation band and channel of at least one antenna/RF chain, the non-AP MLD may perform operating band negotiation with the AP MLD. The non-AP MLD may transmit an operating band negotiation request frame in the format of FIG. 24. Alternatively, when a unique ID is assigned to an operating band and channel of the AP MLD, it may be expressed as shown in FIG. 25. When the AP MLD desires to change an antenna/RF chain of the non-AP MLD, the AP may perform operating band negotiation in the same manner.

The operating band negotiation request frame of FIG. 24 and FIG. 25 may include the following pieces of information.

RA: Receiver address

TA: Transmitter address

Capability Information: Optional capability information

New Operating Class: Includes information on an operating class for band switching. A country element and operating class values specified in the 802.11 baseline specification may be used.

New Channel Number: Includes information on an operating channel after band switching. A country element and operating class values specified in the 802.11 baseline specification may be used.

Max NSS: Indicates the number of spatial streams to be operated in a band and a channel (i.e., a link) corresponding to the new operating class and the new channel number defined above. The maximum number of SSs (i.e., Max NSS) may be determined at an MLD level. For example, the maximum number of streams which may be operated by an MLD may be determined based on the number of antennas included in all STAs included in the MLD. Basically, each of links supported by the MLD may be operated by STAs included in the MLD. However, the maximum NSS which may be operated in each link may not be limited to the number of antennas of STAs operating on each link.

For example, the MLD may include a first STA and a second STA, the first STA may operate on a first link, and the second STA may operate on a second link. Herein, when the first STA may operate two SSs and the second STA may operate two SSs, since the MLD may operate up to four SSs, Max NSS is 4. Herein, the first STA may operate only two SSs, but the MLD may share the antenna of the second STA and use it for the first link. Therefore, the maximum NSS which may be operated on the first link based on antenna sharing is eventually equal to the Max NSS of the MLD. Similarly, the maximum NSS which may be operated on the second link is equal to the Max NSS of the MLD.

Supported Band and Channel Info: If there is an already negotiated ID (e.g., link ID) for a band or channel operated by the AP, the ID may be used.

Figure 26:
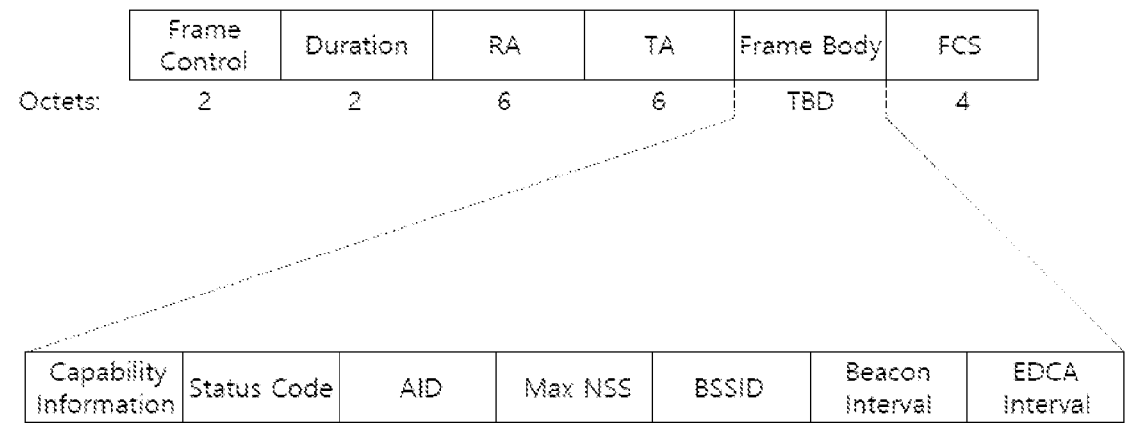
FIG. 26 illustrates an embodiment of an operating band negotiation response frame format.

FIG. 26 illustrates an embodiment of an operating band negotiation response frame format.

Referring to FIG. 26, upon receiving the request frame, the AP MLD may respond thereto using an operating band negotiation frame or in a similar manner as in the existing ACK frame. That is, the AP MLD may configure the operating band negotiation response frame as shown in FIG. 26. The operating band negotiation response frame may include the following pieces of information.

New Operating Class: Includes information on an operating class for band switching. A country element and operating class value specified in the 802.11 baseline specification may be used.

New Channel Number: Includes information on an operating channel after band switching. A country element and operating class value specified in the 802.11 baseline specification may be used.

Max NSS: Indicates the number of spatial streams to be operated in a band and a channel corresponding to the new operating class and the new channel number defined above. The maximum number of SSs (i.e., Max NSS) may be determined at an MLD level. For example, the maximum number of streams which may be operated by an MLD may be determined based on the number of antennas included in all STAs included in the MLD. Basically, each of links supported by the MLD may be operated by STAs included in the MLD. However, the maximum NSS which may be operated in each link may not be limited to the number of antennas of STAs operating on each link.

For example, the MLD may include a first STA and a second STA, the first STA may operate on a first link, and the second STA may operate on a second link. Herein, when the first STA may operate two SSs and the second STA may operate two SSs, since the MLD may operate up to four SSs, Max NSS is 4. Herein, the first STA may operate only two SSs, but the MLD may share the antenna of the second STA and use it for the first link. Therefore, the maximum NSS which may be operated on the first link based on antenna sharing is eventually equal to the Max NSS of the MLD. Similarly, the maximum NSS which may be operated on the second link is equal to the Max NSS of the MLD.

BSSID: Indicates the BSSID of a BSS to be established when a new BSS is established. This information may be omitted if the same BSSID is used.

Beacon Interval: Indicates a beacon interval in a defined channel. This information may be omitted if the same beacon interval is used.

EDCA Interval: Indicates time information on an interval if there is an EDCA/scheduled-only access interval in a defined channel.

Figure 27:
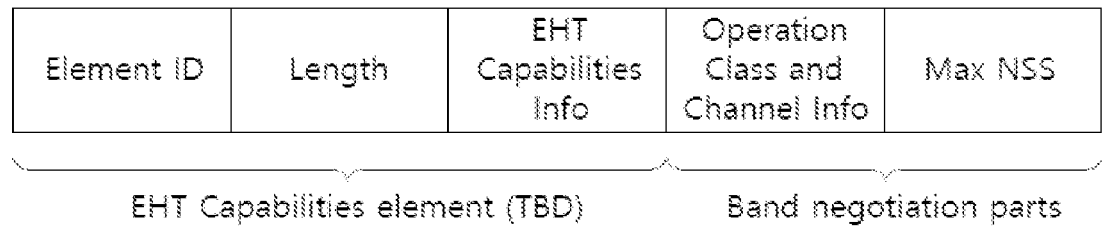
FIG. 27 illustrates an embodiment of an EHT capabilities elements format.

FIG. 27 illustrates an embodiment of an EHT capabilities elements format.

Referring to FIG. 27, an STA MLD may transfer capability information to an AP MLD not in the form of a determined frame but in the form of an element. In the existing specification, the AP MLD and the non-AP MLD exchange capability information and operation information through an HT Capability/Operation, VHT Capability/Operation, and HE Capability/Operation element. Likewise, in EHT, an EHT Capability/Operation element may be designed, and a procedure for band negotiation may be performed through the element. As shown in FIG. 27, an EHT Capabilities element to be designed in the future may include a field capable of indicating Operation Class and Channel Info and Max NSS, thereby negotiating for band and channel change of an antenna/RF chain of the non-AP MLD.

2. Embodiment

Figure 28:
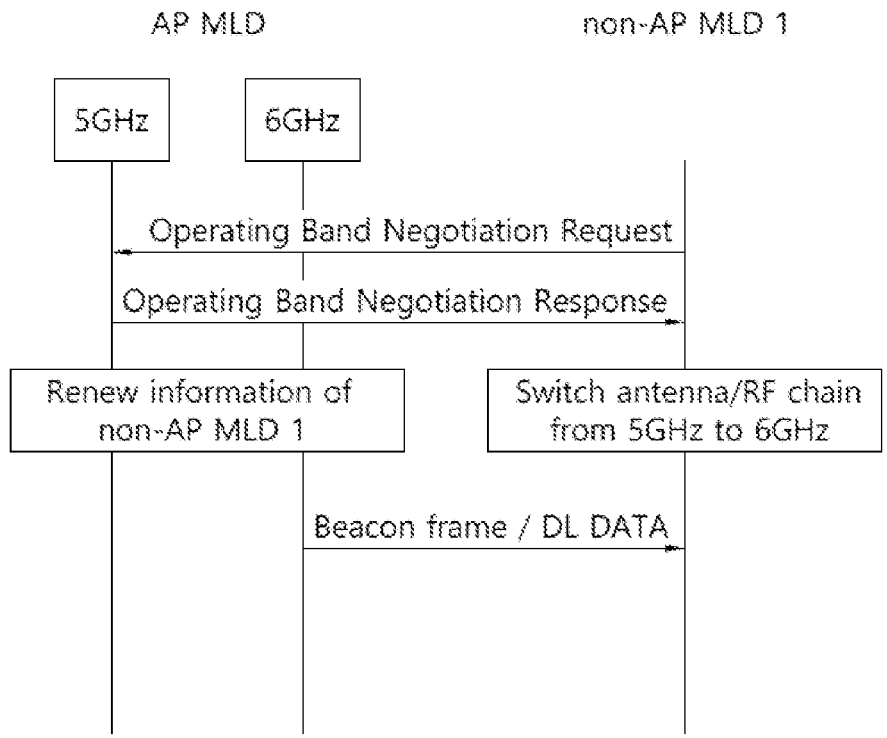
FIG. 28 is a flowchart illustrating an example of an operating band switching procedure.

FIG. 28 is a flowchart illustrating an example of an operating band switching procedure.

Figure 29:
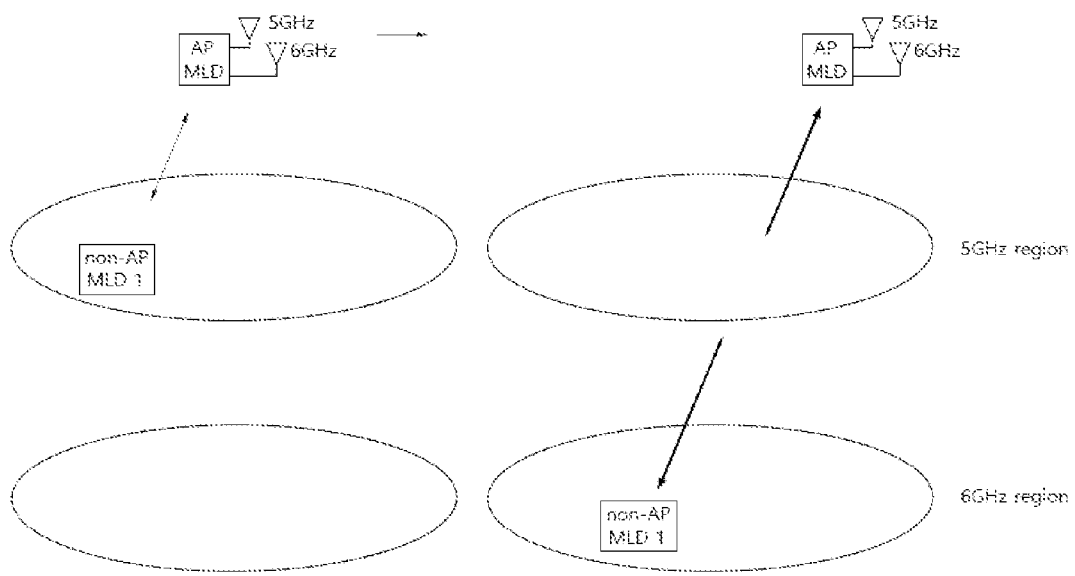
FIG. 29 illustrates an example of an operating band switching procedure.

FIG. 29 illustrates an example of an operating band switching procedure.

When an AP MLD operates a multi-band of 5 GHz and 6 GHz and knows that a non-AP MLD1 is able to use a shared antenna/RF channel, the AP MLD may perform operating band negotiation with the non-AP MLD1. The non-AP MLD1 exchanges antenna/RF chain information (e.g., the number of shared antennas/RF chains, a supportable band, etc.) in a process of associating with the AP MLD. The non-AP MLD1, which knows that the AP MLD supports 6 GHz, desires to operate a shared antenna/RF chain in 6 GHz, and switches from 5 GHz to 6 GHz after exchanging an operating band negotiation request/response frame. The AP MLD updates information on an STA1 and then performs transmission and reception on the switched 6 GHz band. A series of processes is illustrated in FIG. 28 and FIG. 29. In addition, it is also possible that the operating band negotiation request is transmitted first by the AP MLD to adjust a band of an antenna/RF chain of the receiving non-AP MLD1.

Figure 30:
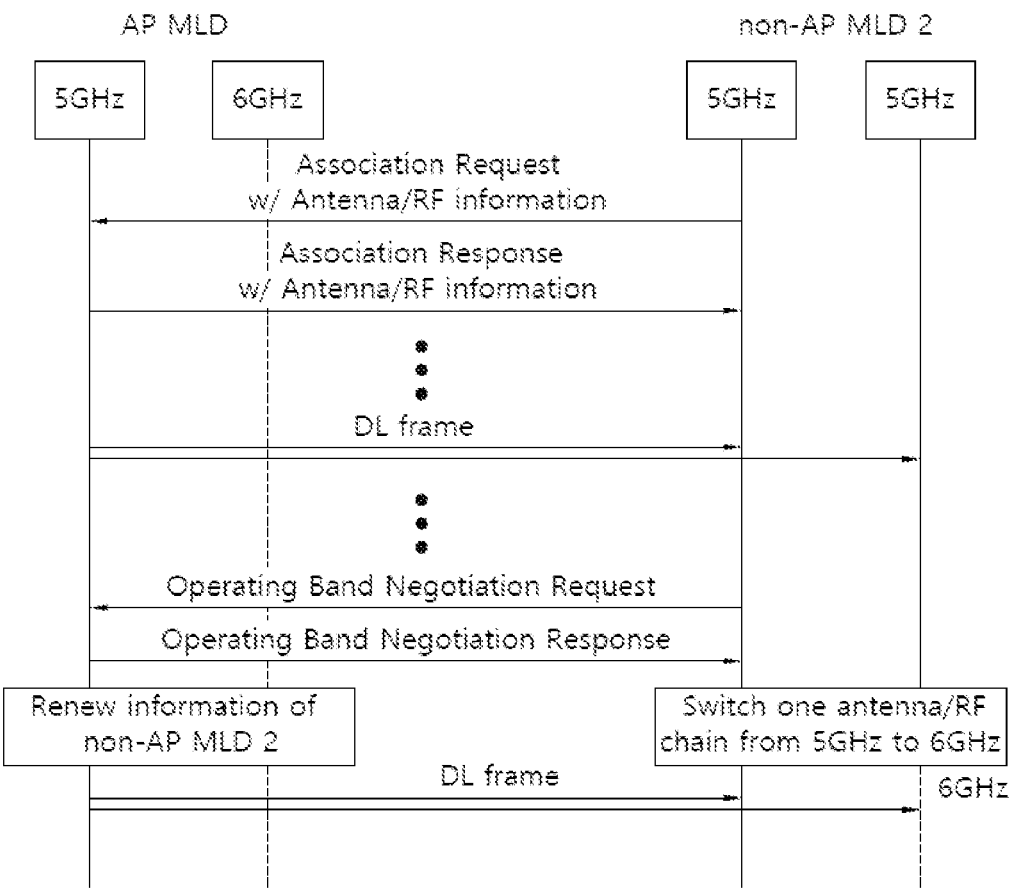
FIG. 30 is a flowchart illustrating another example of an operating band switching procedure.

FIG. 30 is a flowchart illustrating another example of an operating band switching procedure.

Figure 31:
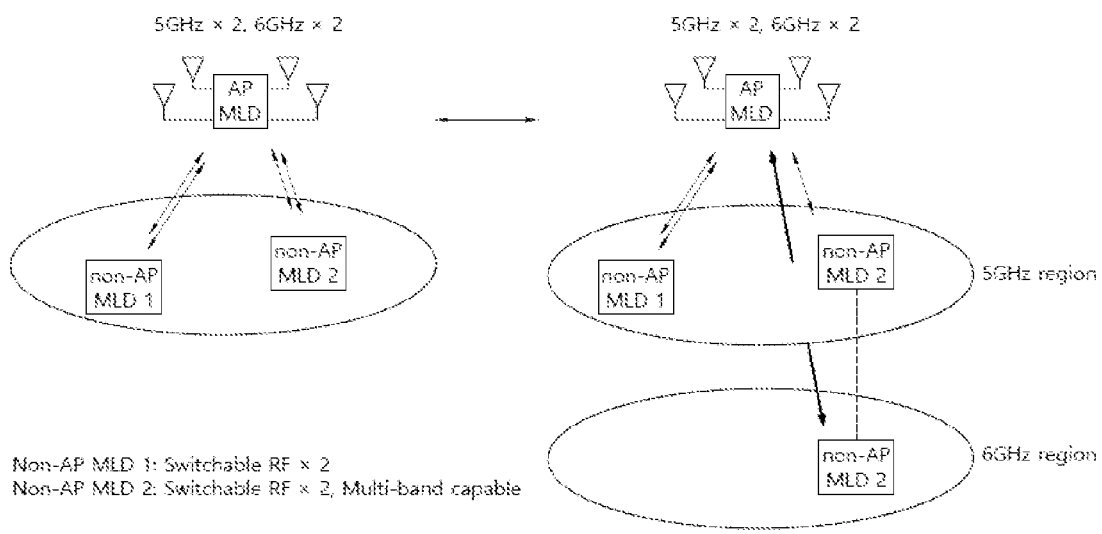
FIG. 31 illustrates another example of an operating band switching procedure.

FIG. 31 illustrates another example of an operating band switching procedure.

The same scenario may be applied to a multi-band-capable STA 2. When an AP operates a multi-band of 5 GHz and 6 GHz and knows that the STA 2 is able to use a shared antenna/RF chain, the AP may perform an operating band negotiation with the STA2. The STA 2 exchanges antenna/RF chain information (e.g., the number of shared antennas/RF chains, a supportable band, etc.) in a process of associating with the AP. When the STA2, which knows that the AP supports 6 GHZ, desires to operate a shared antenna/RF chain in 6 GHz, the STA2 exchanges an operating band negotiation request/response frame and then switches from 5 GHZ to 6 GHz. The AP updates information on the STA2 and then performs multi-band data transmission and reception in the 5 GHz and 6 GHz band. A series of processes is illustrated in FIG. 30 and FIG. 31. In addition, it is also possible that the operating band negotiation request is transmitted first by the AP to adjust a band of an antenna/RF chain of the receiving STA.

3. Operational Procedure

Figure 32:
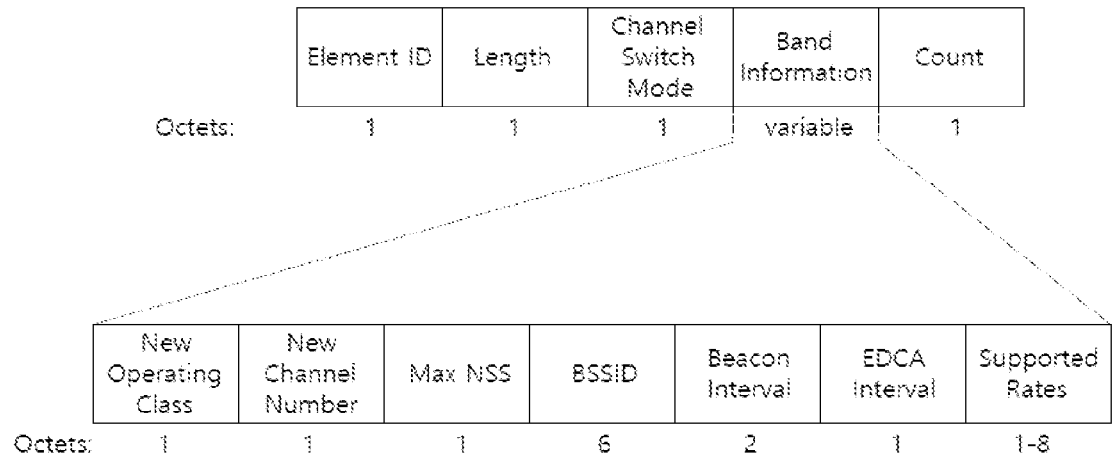
FIG. 32 illustrates an embodiment of a band switch announcement element.

FIG. 32 illustrates an embodiment of a band switch announcement element.

Referring to FIG. 32, an element for band switch announcement may include the following pieces of information.

- Band Information: Includes information on a band to be switched.
- Channel Switch Mode: Is a field included in the exiting (Extended) Channel Switch Announcement element, and prevents an STA receiving this information from transmission until a bandwidth occurs.
- New Operating Class: Includes information on an operating class for band switching. A country element and operating class values specified in the 802.11 baseline specification may be used.
- New Channel Number: Includes information on an operating channel after band switching. A country element and operating class values specified in the 802.11 baseline specification may be used.
- Max NSS: Indicates the number of spatial streams to be operated in a band and a channel corresponding to the new operating class and the new channel number defined above. The maximum number of SSs (i.e., Max NSS) may be determined at an MLD level. For example, the maximum number of streams which may be operated by an MLD may be determined based on the number of antennas included in all STAs included in the MLD. Basically, each of links supported by the MLD may be operated by STAs included in the MLD. However, the maximum NSS which may be operated in each link may not be limited to the number of antennas of STAs operating on each link.

For example, the MLD may include a first STA and a second STA, the first STA may operate on a first link, and the second STA may operate on a second link. Herein, when the first STA may operate two SSs and the second STA may operate two SSs, since the MLD may operate up to four SSs, Max NSS is 4. Herein, the first STA may operate only two SSs, but the MLD may share the antenna of the second STA and use it for the first link. Therefore, the maximum NSS which may be operated on the first link based on antenna sharing is eventually equal to the Max NSS of the MLD. Similarly, the maximum NSS which may be operated on the second link is equal to the Max NSS of the MLD.

- BSSID: Indicates the BSSID of a new BSS to be established when a new BSS is established. This information may be omitted if the same BSSID is used.
- Beacon Interval: Indicates a beacon interval in a defined channel. This information may be omitted if the same beacon interval is used.
- EDCA Interval: Indicates time information on an interval if there is an EDCA/scheduled-only access interval in a defined channel.
- Supported Rates: Indicates a rate which can be supported in a defined channel.
- Count: Indicates the number of beacons remaining until defined switching is applied.

Information other than the aforementioned pieces of information may also be included in this element. For example, an MLD may configure the band switch announcement element as shown in FIG. 32. This element is an example of the band switch announcement element, and a length of each field may vary. Further, additional information may be included or unnecessary information may be omitted.

Figure 33:
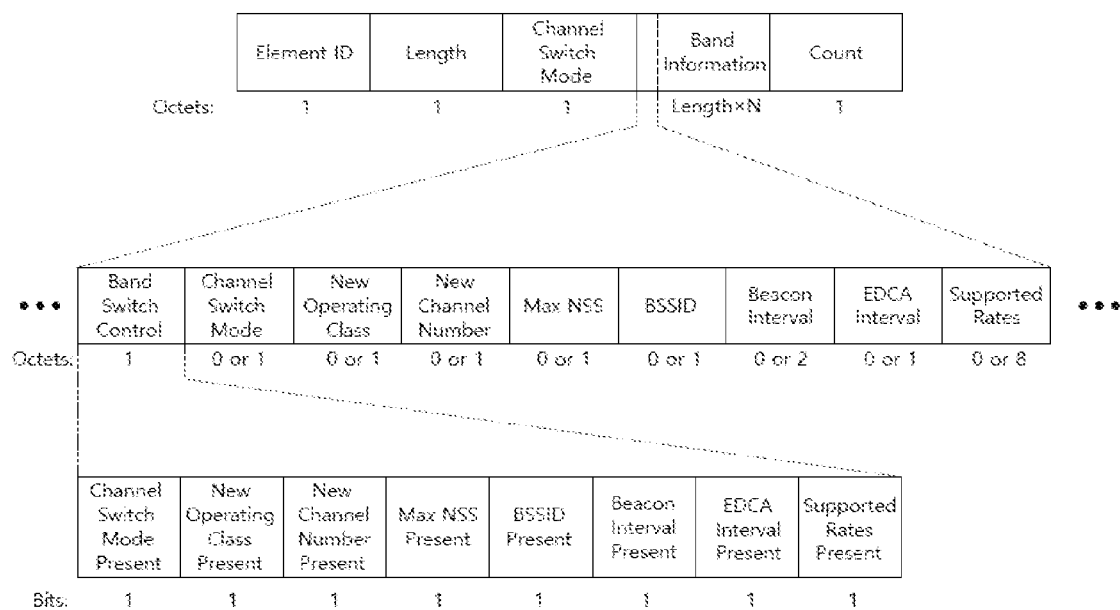
FIG. 33 illustrates an embodiment of a band switch announcement element.

FIG. 33 illustrates an embodiment of a band switch announcement element.

Referring to FIG. 33, an embodiment in which all pieces of information of a band to be switched after band switching are included in one element is also possible. At least one piece of band information may be included in one field referred to as Band Switch List. A subfield in the List may be indicated through a band switch control field.

4. Embodiment $$5 \text{ GHz } RF \times 4 \rightarrow 5 \text{ GHz } RF \times 2 + 6 \text{ GHz } RF \times 2 \qquad 1)$$

A congestion level in 5 GHz and 6 GHz bands may significantly vary depending on a capability of an MLD associated with an AP MLD. For this reason, there may be a case where an AP having a shared RF and operating in a 5 GHz band desires to switch some RFs to 6 GHZ.

Figure 34:
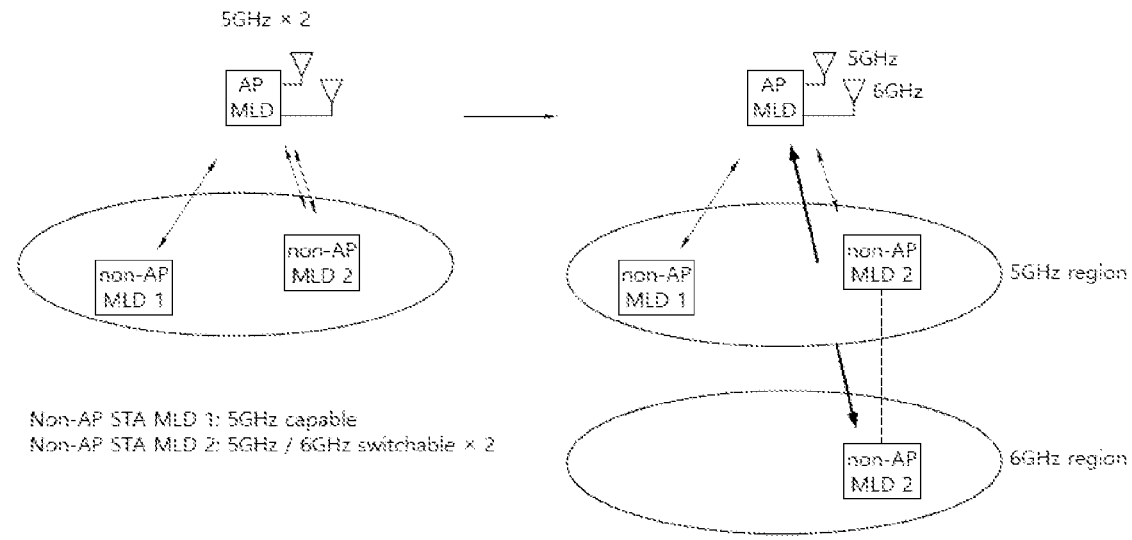
FIG. 34 illustrates an embodiment of a band switch procedure.

FIG. 34 illustrates an embodiment of a band switch procedure.

Referring to FIG. 34, when an AP MLD having a shared RF desires to switch some RFs to a different band, it may be announced to an associated STA MLD through a band switch announcement element. An STA MLD 1 using a shared RF switches to 6 GHz and then performs a transmission/reception process.

When an STA MLD 2 also has a shared RF and is able to use two or more different bands at the same time (multi-band capable), the STA MLD 2 which has received this may determine whether to perform band switching, based on information included in the band switch announcement element. Upon determining to perform transmission and reception through a multi-band after switching only one RF, the STA MLD 2 switches one RF from a 5 GHz band to a 6 GHz band and then performs a transmission and reception process.

As illustrated in the embodiment of FIG. 34, an STA MLD which desires to perform band switching needs to notify the AP of this, but may allow the AP MLD to attempt DL transmission. This operation may be possible by transmitting a random frame or a QoS null frame in a band to which the STA MLD 2 desires to switch (6 GHz in this embodiment). However, in this specification, such a method is not limited thereto.

Hereinafter, the aforementioned embodiment is described with reference to FIG. 21 to FIG. 34.

Figure 35:
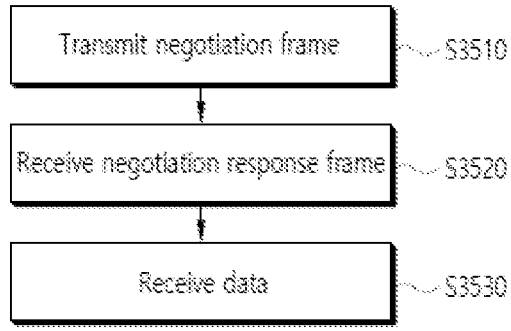
FIG. 35 illustrates an embodiment of a method performed in a non-AP (access point) STA (station) MLD (multi-link device).

FIG. 35 illustrates an embodiment of a method performed in a non-AP (access point) STA (station) MLD (multi-link device).

Referring to FIG. 35, the non-AP STA MLD may transmit a negotiation frame (S3510). For example, the non-AP STA MLD may transmit the negotiation frame including first maximum number of spatial stream (NSS) information to an AP MLD through a first link.

For example, the first maximum NSS information may be the maximum number of streams which are operated by the non-AP STA MLD on the first link.

For example, the negotiation frame may further include information related to antenna sharing.

For example, the negotiation frame may further include information related to operating band switching.

For example, the operating band negotiation request frame may include the following pieces of information.

RA: Receiver address.

TA: Transmitter address.

Capability Information: Optional capability information

New Operating Class: Includes information on an operating class for band switching. A country element and operating class value specified in the 802.11 baseline specification may be used.

New Channel Number: Includes information on an operating channel after band switching. A country element and operating class values specified in the 802.11 baseline specification may be used.

Max NSS: Indicates the number of spatial streams to be operated in a band and a channel (i.e., a link) corresponding to the new operating class and the new channel number defined above. The maximum number of SSs (i.e., Max NSS) may be determined at an MLD level. For example, the maximum number of streams which may be operated by an MLD may be determined based on the number of antennas included in all STAs included in the MLD. Basically, each of links supported by the MLD may be operated by STAs included in the MLD. However, the maximum NSS which may be operated in each link may not be limited to the number of antennas of STAs operating on each link.

For example, the MLD may include a first STA and a second STA, the first STA may operate on a first link, and the second STA may operate on a second link. Herein, when the first STA may operate two SSs and the second STA may operate two SSs, since the MLD may operate up to four SSs, Max NSS is 4. Herein, the first STA may operate only two SSs, but the MLD may share the antenna of the second STA and use it for the first link. Therefore, the maximum NSS which may be operated on the first link based on antenna sharing is eventually equal to the Max NSS of the MLD. Similarly, the maximum NSS which may be operated on the second link is equal to the Max NSS of the MLD.

Supported Band and Channel Info: If there is an already negotiated ID (e.g., link ID) for a band or channel operated by the AP, the ID may be used.

The non-AP STA MLD may receive a negotiation response frame (S3520). For example, the non-AP STA MLD may receive the negotiation response frame from the AP MLD through the first link in response to the negotiation frame. For example, the operating band negotiation response frame may include the following pieces of information.

New Operating Class: Includes information on an operating class for band switching. A country element and operating class value specified in the 802.11 baseline spec may be used.

New Channel Number: Includes information on an operating channel after band switching. A country element and operating class values specified in the 802.11 baseline specification may be used.

Max NSS: Indicates the number of spatial streams to be operated in a band and a channel corresponding to the new operating class and the new channel number defined above. The maximum number of SSs (i.e., Max NSS) may be determined at an MLD level. For example, the maximum number of streams which may be operated by an MLD may be determined based on the number of antennas included in all STAs included in the MLD. Basically, each of links supported by the MLD may be operated by STAs included in the MLD. However, the maximum NSS which may be operated in each link may not be limited to the number of antennas of STAs operating on each link.

For example, the MLD may include a first STA and a second STA, the first STA may operate on a first link, and the second STA may operate on a second link. Herein, when the first STA may operate two SSs and the second STA may operate two SSs, since the MLD may operate up to four SSs, Max NSS is 4. Herein, the first STA may operate only two SSs, but the MLD may share the antenna of the second STA and use it for the first link. Therefore, the maximum NSS which may be operated on the first link based on antenna sharing is eventually equal to the Max NSS of the MLD. Similarly, the maximum NSS which may be operated on the second link is equal to the Max NSS of the MLD.

BSSID: Indicates the BSSID of a BSS to be established when a new BSS is established. This information may be omitted if the same BSSID is used.

Beacon Interval: Indicates a beacon interval in a defined channel. This information may be omitted if the same beacon interval is used.

EDCA Interval: Indicates time information on an interval if there is an EDCA/scheduled-only access interval in a defined channel.

The non-AP STA MLD may receive data (S3530). For example, the non-AP STA MLD may receive data from the AP MLD through the first link, based on the first maximum NSS information. That is, the AP MLD may transmit data through the first link by using a spatial stream not exceeding a first maximum NSS of the non-AP STA MLD.

For example, the non-AP STA MLD may transmit a negotiation frame including second maximum number of spatial stream (NSS) information to the AP MLD through a second link, receive a negotiation response frame from the AP MLD through the second link in response to the negotiation frame, and receive data from the AP MLD through the second link, based on the second maximum NSS information. For example, the second maximum NSS information may be the maximum number of streams which are operated by the non-AP MLD on the second link.

For example, the maximum (Max) NSS information may be NSS capability information of a link level. That is, maximum NSS capability may be present for each link. The MLD may support multiple links, and each link may have maximum NSS capability. The MLD may include multiple STAs, and the STAs may operate on respective links.

For example, when the MLD includes a first STA and a second STA and supports first and second links, the first STA may operate on the first link and the second STA may operate on the second link. For example, maximum NSS capability of the first link may be greater than the number of antennas of the first STA. For example, the second STA may assist reception/transmission of the first STA through antenna sharing. The maximum NSS capability may change dynamically. For example, the maximum NSS capability of the first link may be determined based on an antenna of the first STA and a sharable antenna of the second STA. The number of sharable antennas of the second STA may vary, and there may be a case where some antennas of the first STA are shared for another STA or are not available. Therefore, the maximum NSS capability may change dynamically.

Since the maximum NSS capability information is transmitted/received, it is possible to obtain an advantage of preventing a problem in that an MLD is not able to receive all streams because a stream with at least NSS capability is transmitted on a specific link.

Figure 36:
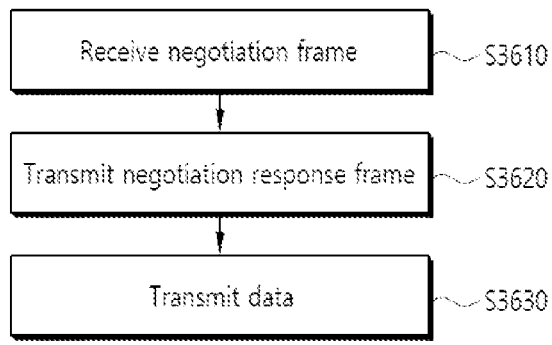
FIG. 36 illustrates an embodiment of a method performed in an AP MLD.

FIG. 36 illustrates an embodiment of a method performed in an AP MLD.

Referring to FIG. 36, the non-AP STA MLD may transmit a negotiation frame (S3610). For example, the AP STA MLD may receive the negotiation frame including first maximum number of spatial stream (NSS) information from the non-AP STA MLD through a first link.

For example, the first maximum NSS information may be the maximum number of streams which are operated by the non-AP STA MLD on the first link.

For example, the negotiation frame may further include information related to antenna sharing.

For example, the negotiation frame may further include information related to operating band switching.

For example, the operating band negotiation request frame may include the following pieces of information.

RA: Receiver address.
TA: Transmitter address.
Capability Information: Optional capability information
New Operating Class: Includes information on an operating class for band switching.
A country element and operating class value specified in the 802.11 baseline specification may be used.
New Channel Number: Includes information on an operating channel after band switching. A country element and operating class value specified in the 802.11 baseline specification may be used.
Max NSS: Indicates the number of spatial streams to be operated in a band and a channel (i.e., a link) corresponding to the new operating class and the new channel number defined above.
Supported Band and Channel Info: If there is an already negotiated ID (e.g., link ID) for a band or channel operated by the AP, the ID may be used.

The AP MLD may transmit a negotiation response frame (S3620). For example, the AP MLD may transmit the negotiation response frame to the non-AP STA MLD through the first link in response to the negotiation frame. For example, the operating band negotiation response frame may include the following pieces of information.

New Operating Class: Includes information on an operating class for band switching. A country element and operating class value specified in the 802.11 baseline spec may be used.
New Channel Number: Includes information on an operating channel after band switching. A country element and operating class values specified in the 802.11 baseline specification may be used.
Max NSS: Indicates the number of spatial streams to be operated in a band and a channel corresponding to the new operating class and the new channel number defined above.
BSSID: Indicates the BSSID of a BSS to be established when a new BSS is established. This information may be omitted if the same BSSID is used.
Beacon Interval: Indicates a beacon interval in a defined channel. This information may be omitted if the same beacon interval is used.
EDCA Interval: Indicates time information on an interval if there is an EDCA/scheduled-only access interval in a defined channel.

The AP MLD may transmit data (S3630). For example, the AP MLD may transmit data from the non-AP STA MLD through the first link, based on the first maximum NSS information. That is, the AP MLD may transmit data through the first link by using a spatial stream not exceeding a first maximum NSS of the non-AP STA MLD.

For example, the non-AP STA MLD may transmit a negotiation frame including second maximum number of spatial stream (NSS) information to the AP MLD through a second link, receive a negotiation response frame from the AP MLD through the second link in response to the negotiation frame, and receive data from the AP MLD through the second link, based on the second maximum NSS information. For example, the second maximum NSS information may be the maximum number of streams which are operated by the non-AP MLD on the second link.

For example, the maximum (Max) NSS information may be NSS capability information of a link level. That is, maximum NSS capability may be present for each link. The MLD may support multiple links, and each link may have maximum NSS capability. The MLD may include multiple STAs, and the STAs may operate on respective links.

For example, when the MLD includes a first STA and a second STA and supports first and second links, the first STA may operate on the first link and the second STA may operate on the second link. For example, maximum NSS capability of the first link may be greater than the number of antennas of the first STA. For example, the second STA may assist reception/transmission of the first STA through antenna sharing. The maximum NSS capability may change dynamically. For example, the maximum NSS capability of the first link may be determined based on an antenna of the first STA and a sharable antenna of the second STA. The number of sharable antennas of the second STA may vary, and there may be a case where some antennas of the first STA are shared for another STA or are not available. Therefore, the maximum NSS capability may change dynamically.

Since the maximum NSS capability information is transmitted/received, it is possible to obtain an advantage of preventing a problem in that an MLD is not able to receive all streams because a stream with at least NSS capability is transmitted on a specific link.

Some of detailed steps shown in the example of FIG. 35 and FIG. 36 may not be essential steps and may be omitted. Other steps may be added in addition to the steps shown in FIG. 35 and FIG. 36, and orders of the steps may vary. Some steps the above steps may have independent technical meaning.

The aforementioned technical feature of the present specification may be applied to various devices and methods. For example, the aforementioned technical feature of the present specification may be performed/supported through the device of FIG. 1 and/or FIG. 19. For example, the aforementioned technical feature of the present specification may be applied only to part of FIG. 1 and/or FIG. 19. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 19. For example, the device of the present specification includes a memory and a processor operatively coupled to the memory. The processor is configured to: transmit a negotiation frame including first maximum number of spatial stream (NSS) information to an AP MLD through a first link; and receive a negotiation response frame from the AP MLD through the first link in response to the negotiation frame.

The technical feature of the present specification may be implemented based on a computer readable medium (CRM). For example, the CRM proposed by the present specification is at least one computer readable medium including an instruction executed by at least one processor of a non-access point (AP) STA MLD of a wireless local area network (WLAN) system. The CRM may store instructions to perform operations of transmitting a negotiation frame including first maximum number of spatial stream (NSS) information to an AP MLD through a first link, and receiving a negotiation response frame from the AP MLD through the first link in response to the negotiation frame.

Instructions stored in a CRM of the present specification may be executed by at least one processor. The at least one processor related to the CRM of the present specification may be the processors 111 and 121 or processing chips 114 and 124 of FIG. 1 or the processor 610 of FIG. 19. Meanwhile, the CRM of the present specification may be the memories 112 and 122 of FIG. 1 or the memory 620 of FIG. 19 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising;
    transmitting, by a non-access point multilink device (non-AP MLD) to an AP MLD, a first frame including a header,
    wherein the header includes a frame control field having a length of 2 octets, a duration field having a length of 2 octets and being contiguous to the frame control field, and an address field having a length of 6 octets and being contiguous to the duration field, wherein the first frame further includes a frame body being contiguous to the header,
wherein the frame body includes a sub-field related to a number of spatial streams, wherein the sub-field indicates a maximum number of spatial streams that each station (STA) affiliated with the non-AP MLD can receive, wherein the non-AP MLD operates on a set of enabled links, wherein the sub-field further indicates a number of spatial streams that the non-AP MLD supports on any set of the enabled links,
wherein the first frame further includes link information related to Link Identifiers (IDs) of the set of enabled links;
receiving, by the non-AP MLD from the AP MLD, a second frame responding to the first frame; and
receiving, by the non-AP MLD, physical protocol data units (PPDUs) based on the maximum number of spatial streams indicated in the sub-field.

2. The method of claim 1, wherein a first link and a second link are configured as the set of the enabled links, two antennas are configured in the non-AP MLD, each of the two antennas is configured to support a maximum of two spatial streams in the non-AP MLD, and the non-AP MLD sets the sub-field to indicate four spatial streams.

3. The method of claim 1, wherein each of the PPDUs includes a legacy-signal (L-SIG) field and a repeated L-SIG (RL-SIG) field which is a repeat of the L-SIG field,
wherein a length field included in the L-SIG field is set to a value satisfying a condition that a remainder is zero when a value of the length field is divided by three (3), wherein the remainder is used to differentiate an extreme high throughput (EHT) PPDU from a high throughput efficiency (HE) PPDU, and
wherein PPDUs are determined as the EHT PPDU based on the remainder having a value of zero (0), and the PPDU is determined as the HE PPDU based on the remainder having a non-zero value.

4. The method of claim 3, wherein each of the PPDUs further includes a universal signal (U-SIG) field which is contiguous to the RL-SIG field, wherein the U-SIG includes a 3-bit field related to a physical version of the PPDUs.

5. The method of claim 1, wherein the link information is included in a Supported Band and Channel Information field of the first frame.

6. A non-access point multilink device (non-AP MLD) in a wireless local area network (LAN) system, comprising:
at least one processor; and
at least one computer memory operably connectable to the at least one processor and storing instructions that, based on being executed by the at least one processor, perform operations comprising:
transmitting a first frame including a header,
wherein the header includes a frame control field having a length of 2 octets, a duration field having a length of 2 octets and being contiguous to the frame control field, and an address field having a length of 6 octets and being contiguous to the duration field,
wherein the first frame further includes a frame body being contiguous to the header,
wherein the frame body includes a sub-field related to a number of spatial streams, wherein the sub-field indicates a maximum number of spatial streams that each station (STA) affiliated with the non-AP MLD can receive, wherein the non-AP MLD operates on a set of enabled links, wherein the sub-field further indicates a number of spatial streams that the non-AP MLD supports on any set of the enabled links,
wherein the first frame further includes link information related to Link Identifiers (IDs) of the set of enabled links;
receiving a second frame responding to the first frame; and
receiving physical protocol data units (PPDUs) based on the maximum number of spatial streams indicated in the sub-field.

7. The non-AP MLD of claim 6, wherein a first link and a second link are configured as the set of the enabled links, two antennas are configured in the non-AP MLD, each of the two antennas is configured to support a maximum of two spatial streams in the non-AP MLD, and the non-AP MLD sets the sub-field to indicate four spatial streams.

8. The non-AP MLD of claim 6, wherein each of the PPDUs includes a legacy-signal (L-SIG) field and a repeated L-SIG (RL-SIG) field which is a repeat of the L-SIG field,
wherein a length field included in the L-SIG field is set to a value satisfying a condition that a remainder is zero when a value of the length field is divided by three (3), wherein the remainder is used to differentiate an extreme high throughput (EHT) PPDU from a high throughput efficiency (HE) PPDU, and
wherein PPDUs are determined as the EHT PPDU based on the remainder having a value of zero (0), and the PPDU is determined as the HE PPDU based on the remainder having a non-zero value.

9. The non-AP MLD of claim 8, wherein each of the PPDUs further includes a universal signal (U-SIG) field which is contiguous to the RL-SIG field, wherein the U-SIG includes a 3-bit field related to a physical version of the PPDUs.

10. The non-AP MLD of claim 6, wherein the link information is included in a Supported Band and Channel Information field of the first frame.

11. A method in a wireless local area network (WLAN) system, the method comprising;
receiving, by an access point multilink device (AP MLD) from a non-AP MLD, a first frame including a header,
wherein the header includes a frame control field having a length of 2 octets, a duration field having a length of 2 octets and being contiguous to the frame control field, and an address field having a length of 6 octets and being contiguous to the duration field,
wherein the first frame further includes a frame body being contiguous to the header,
wherein the frame body includes a sub-field related to a number of spatial streams, wherein the sub-field indicates a maximum number of spatial streams that each station (STA) affiliated with the non-AP MLD can receive, wherein the non-AP MLD operates on a set of enabled links, wherein the sub-field further indicates a number of spatial streams that the non-AP MLD supports on any set of the enabled links,
wherein the first frame further includes link information related to Link Identifiers (IDs) of the set of enabled links;
transmitting, by the AP MLD to the non-AP MLD, a second frame responding to the first frame; and
transmitting, by the AP MLD to the non-AP MLD, physical protocol data units (PPDUs) based on the maximum number of spatial streams indicated in the sub-field.

12. The method of claim 11, wherein a first link and a second link are configured as the set of the enabled links, two antennas are configured in the non-AP MLD, each of the two antennas is configured to support a maximum of two spatial streams in the non-AP MLD, and the non-AP MLD sets the sub-field to indicate four spatial streams.

13. The method of claim 11, wherein each of the PPDUs includes a legacy-signal (L-SIG) field and a repeated L-SIG (RL-SIG) field which is a repeat of the L-SIG field,
   wherein a length field included in the L-SIG field is set to a value satisfying a condition that a remainder is zero when a value of the length field is divided by three (3), wherein the remainder is used to differentiate an extreme high throughput (EHT) PPDU from a high throughput efficiency (HE) PPDU, and
   wherein PPDUs are determined as the EHT PPDU based on the remainder having a value of zero (0), and the PPDU is determined as the HE PPDU based on the remainder having a non-zero value.

14. The method of claim 13, wherein each of the PPDUs further includes a universal signal (U-SIG) field which is contiguous to the RL-SIG field, wherein the U-SIG includes a 3-bit field related to a physical version of the PPDUs.

15. The method of claim 11, wherein the link information is included in a Supported Band and Channel Information field of the first frame.

* * * * *